United States Patent
Agiwal et al.

(10) Patent No.: US 11,778,448 B2
(45) Date of Patent: *Oct. 3, 2023

(54) METHOD AND APPARATUS FOR PERFORMING INTER-CARRIER D2D COMMUNICATION

(71) Applicant: Samsung Electronics Co., Ltd., Suwon-si (KR)

(72) Inventors: Anil Agiwal, Suwon-si (KR); Hyun-Seok Ryu, Yongin-si (KR); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,411

(22) Filed: Jan. 10, 2022

(65) Prior Publication Data

US 2022/0132292 A1    Apr. 28, 2022

Related U.S. Application Data

(60) Continuation of application No. 16/555,339, filed on Aug. 29, 2019, now Pat. No. 11,228,893, which is a
(Continued)

(30) Foreign Application Priority Data

Aug. 6, 2015   (IN) ............................. 861/KOL/2015
Oct. 29, 2015  (IN) ........................... 1118/KOL/2015

(51) Int. Cl.
*H04W 8/00*    (2009.01)
*H04W 48/16*   (2009.01)

(52) U.S. Cl.
CPC ............ H04W 8/005 (2013.01); *H04W 48/16* (2013.01)

(58) Field of Classification Search
CPC ............................. H04W 8/005; H04W 48/16
See application file for complete search history.

(56) References Cited

U.S. PATENT DOCUMENTS 9,419,776 B2   8/2016   Gauvreau et al.
9,769,690 B2   9/2017   Mo et al.
(Continued)

FOREIGN PATENT DOCUMENTS

CN   103118368 A   5/2013
CN   103997727 A   8/2014
(Continued)

OTHER PUBLICATIONS

Hearing Notice dated Jul. 4, 2022 in connection with India Patent Application No. 201837004742, 2 pages.
(Continued)

*Primary Examiner* — Parth Patel

(57) ABSTRACT

A system and method for use in a pre-$5^{th}$-Generation (5G) or 5G communication system to be provided for supporting higher data rates Beyond $4^{th}$-Generation (4G) communication system such as Long Term Evolution (LTE) is disclosed. The method for performing a discovery transmission on a second carrier by a user equipment (UE) served by a primary cell (PCell) on a first carrier, includes receiving, from a base station, a signaling indicating that the UE read discovery resource configuration for the second carrier on the second carrier or that the UE should request the discovery resource configuration for the second carrier from the base station for acquiring the discovery resource configuration for the second carrier. The method also includes acquiring the discovery resource configuration based on the signaling.

16 Claims, 17 Drawing Sheets

Related U.S. Application Data division of application No. 15/230,326, filed on Aug. 5, 2016, now Pat. No. 10,440,550.

(56) References Cited

U.S. PATENT DOCUMENTS

| | | | |
|---|---|---|---|
| 9,769,862 | B2 | 9/2017 | Sheng |
| 9,794,811 | B2 | 10/2017 | Lim et al. |
| 10,368,296 | B2 | 7/2019 | Harada et al. |
| 10,491,345 | B2 | 11/2019 | Chae et al. |
| 10,541,776 | B2 | 1/2020 | Ryu et al. |
| 11,228,893 | B2 * | 1/2022 | Agiwal ................ H04W 8/005 |
| 2008/0049683 | A1 | 2/2008 | Nakamata et al. |
| 2009/0122771 | A1 | 5/2009 | Cai |
| 2010/0035575 | A1 | 2/2010 | Wu |
| 2010/0304748 | A1 | 12/2010 | Henttonen et al. |
| 2010/0330943 | A1 | 12/2010 | Hoepfner |
| 2013/0039342 | A1 | 2/2013 | Kazmi |
| 2013/0107763 | A1 | 5/2013 | Uyehara et al. |
| 2013/0210429 | A1 | 8/2013 | Aoyagi et al. |
| 2013/0308490 | A1 | 11/2013 | Lim et al. |
| 2014/0057670 | A1 | 2/2014 | Lim et al. |
| 2014/0094212 | A1 * | 4/2014 | Ahn ........................ H04W 4/70 |
| | | | 455/517 |
| 2014/0098761 | A1 | 4/2014 | Lee et al. |
| 2014/0185495 | A1 | 7/2014 | Kuchibhotla et al. |
| 2014/0211680 | A1 | 7/2014 | Seok et al. |
| 2014/0295832 | A1 | 10/2014 | Ryu et al. |
| 2014/0321282 | A1 | 10/2014 | Pragada et al. |
| 2015/0003287 | A1 | 1/2015 | Kalhan et al. |
| 2015/0003348 | A1 | 1/2015 | Ishii et al. |
| 2015/0043483 | A1 | 2/2015 | Sartori et al. |
| 2015/0124775 | A1 | 5/2015 | Guo |
| 2015/0163770 | A1 | 6/2015 | Guo et al. |
| 2015/0195770 | A1 | 7/2015 | Sun et al. |
| 2015/0215903 | A1 | 7/2015 | Zhao et al. |
| 2015/0223245 | A1 | 8/2015 | Cheng et al. |
| 2015/0230157 | A1 | 8/2015 | Rattner et al. |
| 2015/0245193 | A1 | 8/2015 | Xiong et al. |
| 2015/0256995 | A1 | 9/2015 | Rune et al. |
| 2015/0264663 | A1 | 9/2015 | Chen et al. |
| 2015/0264699 | A1 | 9/2015 | Fwu et al. |
| 2015/0312841 | A1 * | 10/2015 | Sirotkin .............. H04W 40/246 |
| | | | 370/254 |
| 2015/0319737 | A1 | 11/2015 | Cheng et al. |
| 2015/0350941 | A1 | 12/2015 | You et al. |
| 2016/0007406 | A1 | 1/2016 | Yi et al. |
| 2016/0036762 | A1 * | 2/2016 | Droms .................... H04L 41/12 |
| | | | 709/224 |
| 2016/0044552 | A1 | 2/2016 | Heo et al. |
| 2016/0066255 | A1 | 3/2016 | Marinier et al. |
| 2016/0095008 | A1 | 3/2016 | Zhao et al. |
| 2016/0100442 | A1 | 4/2016 | Xu et al. |
| 2016/0191230 | A1 | 6/2016 | Shi et al. |
| 2016/0198513 | A1 * | 7/2016 | Takano ................. H04W 48/12 |
| | | | 370/329 |
| 2016/0205668 | A1 | 7/2016 | Fujishiro et al. |
| 2016/0205678 | A1 | 7/2016 | Fujishiro et al. |
| 2016/0212609 | A1 | 7/2016 | Fujishiro et al. |
| 2016/0234702 | A1 | 8/2016 | Heo et al. |
| 2016/0242152 | A1 | 8/2016 | Yu et al. |
| 2016/0255615 | A1 | 9/2016 | Chatterjee et al. |
| 2016/0269885 | A1 | 9/2016 | Kim et al. |
| 2016/0278003 | A1 | 9/2016 | Kim et al. |
| 2016/0302250 | A1 | 10/2016 | Sheng |
| 2016/0366676 | A1 | 12/2016 | Fujishiro et al. |
| 2017/0019822 | A1 | 1/2017 | Zhao et al. |
| 2017/0034751 | A1 | 2/2017 | Fujishiro et al. |
| 2017/0041773 | A1 | 2/2017 | Fujishiro et al. |
| 2017/0048786 | A1 * | 2/2017 | Belleschi .............. H04L 5/1469 |
| 2017/0064534 | A1 | 3/2017 | Loehr et al. |
| 2017/0086055 | A1 | 3/2017 | Klatt et al. |
| 2017/0111886 | A1 | 4/2017 | Kim et al. |
| 2017/0134999 | A1 | 5/2017 | Wu et al. |
| 2017/0135074 | A1 | 5/2017 | Yi et al. |
| 2017/0150501 | A1 | 5/2017 | Park |
| 2017/0202042 | A1 | 7/2017 | Gao et al. |
| 2017/0215107 | A1 | 7/2017 | Kakishima et al. |
| 2017/0238272 | A1 | 8/2017 | You et al. |
| 2017/0251442 | A1 | 8/2017 | Kalhan |
| 2017/0303240 | A1 | 10/2017 | Basu Mallick et al. |
| 2017/0311293 | A1 | 10/2017 | Jung et al. |
| 2017/0317968 | A1 * | 11/2017 | Droms ................ H04L 61/4511 |
| 2017/0339511 | A1 | 11/2017 | Lee et al. |
| 2018/0020339 | A1 | 1/2018 | Agiwal et al. |
| 2018/0035408 | A1 | 2/2018 | Zhang et al. |
| 2018/0070219 | A1 | 3/2018 | Khoryaev et al. |
| 2018/0070264 | A1 | 3/2018 | Saiwai et al. |
| 2018/0084407 | A1 | 3/2018 | Jung et al. |
| 2018/0092112 | A1 | 3/2018 | Jung et al. |
| 2018/0115967 | A1 | 4/2018 | Ahn et al. |
| 2018/0124621 | A1 | 5/2018 | Jung et al. |
| 2018/0139798 | A1 | 5/2018 | Jung et al. |
| 2018/0152272 | A1 * | 5/2018 | Chae ..................... H04W 48/12 |
| 2018/0167988 | A1 | 6/2018 | Jung et al. |
| 2018/0192354 | A1 | 7/2018 | Yi et al. |
| 2018/0227869 | A1 | 8/2018 | Lin |
| 2018/0368144 | A1 | 12/2018 | Xiong et al. |
| 2019/0045345 | A1 | 2/2019 | Lee et al. |
| 2019/0373440 | A1 | 12/2019 | Agiwal et al. |
| 2019/0387391 | A1 * | 12/2019 | Agiwal ................ H04W 8/005 |
| 2020/0107382 | A1 | 4/2020 | Jung et al. |
| 2022/0132292 | A1 * | 4/2022 | Agiwal ................ H04W 8/005 |

FOREIGN PATENT DOCUMENTS

| | | |
|---|---|---|
| CN | 104812089 A | 7/2015 |
| EP | 2756647 A4 | 7/2014 |
| IN | 316KOL2015 A | 8/2016 |
| WO | 2014124610 A1 | 8/2014 |
| WO | 2015053382 A1 | 4/2015 |
| WO | 2015065130 A1 | 5/2015 |
| WO | 2015065768 A1 | 5/2015 |
| WO | 2015065881 A1 | 5/2015 |

OTHER PUBLICATIONS

NTT Docomo, Inc., "Enhancement for Inter-carrier D2D Discovery", 3GPP TSG RAN WG2 #90, May 25-29, 2015, R2-152333, 4 pages.

Catt, "Enhancement on discovery in inter-frequency/inter-PLMN scenario", 3GPP TSG-RAN WG2 Meeting #89bis, Apr. 20-24, 2015, R2-151239, 3 pages.

Communication under Rule 71(3) EPC dated Oct. 7, 2022 in connection with European Patent Application No. 16 833 380.5, 57 pages.

Office Action dated Oct. 5, 2022 in connection with Korean Patent Application No. 10-2016-0100174, 7 pages.

The International Searching Authority, "International Search Report," International Application No. PCT/KR2016/008662, dated Nov. 8, 2016, 4 pages, publisher the ISA/KR, International Application Division, Korean Intellectual Property Office, Daejeon, Republic of Korea.

The International Searching Authority, "Written Opinion of the International Searching Authority," International Application No. PCT/KR2016/008662, dated Nov. 8, 2016, 6 pages, publisher the ISA/KR, International Application Division, Korean Intellectual Property Office, Daejeon, Republic of Korea.

European Patent Office, "Communication pursuant to Article 94(3) EPC," Application No. EP16833380.5, dated Nov. 11, 2019, 8 pages.

Office Action dated Oct. 22, 2020 in connection with India Patent Application No. 201837004742, 6 pages.

Supplementary Partial European Search Report dated Jun. 1, 2018 in connection with European Patent Application No. 16 83 3380.

The First Office Action dated Apr. 26, 2021, in connection with Chinese Patent Application No. 201680046211.6, 21 pages.

Huawei et al., Discovery transmission on inter-carriers of intra-PLMN and inter-PLMN, R2-152499, 3GPP TSG RAN WG2 Meeting #90, Fukuoka, Japan, May 25-29, 2015, 8 pages.

(56) References Cited

OTHER PUBLICATIONS

Kyocera, "Enhanced ProSe discovery for intra-PLMN," R2-152611, 3GPP TSG RAN WG2 Meeting #90, Fukuoka, Japan, May 25-29, 2015, 7 pages.
LG Electronics, "On supporting discovery in a carrier other than PCell", 3GPP TSG RAN WG1 Meeting #81, May 25-29, 2015, 5 pages, R1-152726.
LG Electronics, "Non-Pcell discovery configuration provisioning to UE", 3GPP TSG RAN WG2 #90, May 25-29, 2015, 3 pages, R2-152757.
Samsung, "Inter Carrier Discovery", 3GPP TSG RAN WG2 Meeting #90, May 25-29, 2015, 6 pages, R2-152144.
Zte, "On ProSe Discovery for inter-frequency and inter-PLMN," R2-152556, 3GPP TSG RAN WG2 Meeting #90, Fukuoka, Japan, May 25-29, 2015, 6 pages.
Korean Intellectual Property Office, "Written Decision of Registration," dated Apr. 3, 2023, in connection with Korean Patent Application No. 10-2016-0100174, 11 pages.

* cited by examiner

METHOD AND APPARATUS FOR PERFORMING INTER-CARRIER D2D COMMUNICATION

CROSS-REFERENCE TO RELATED APPLICATIONS

This application is a continuation of application Ser. No. 16/555,339, filed Aug. 29, 2019, now U.S. Pat. No. 11,228,893, which is a divisional of application Ser. No. 15/230,326, filed Aug. 5, 2016, now U.S. Pat. No. 10,440,550, which claims priority to Indian Patent Application No. 861/KOL/2015, filed Aug. 6, 2015, and Indian Patent Application No. 1118/KOL/2015, filed Oct. 29, 2015, the entire disclosures of which are incorporated herein by reference.

BACKGROUND

1. Field

The present disclosure concerns methods and apparatuses for performing inter-carrier device-to-device (D2D) communication, and more specifically, to methods and apparatuses for managing resources for transmitting and receiving inter-carrier discovery signals.

2. Description of Related Art

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 gigaHertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift key (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Device to device (D2D) communication is being researched for enabling discovery and data communication services between user equipments (UEs). Discovery is a process for determining that a D2D-enabled UE is present adjacent to another D2D-enabled UE. Discovering a D2D-enabled UE determines whether another D2D-enabled UE is interested in using D2D discovery. A D2D-enabled UE may have interest in discovering another D2D-enabled UE when its proximity needs to be known by one or more authenticated applications by discovering a D2D-enabled UE. For example, a social networking application may be enabled to use D2D discovery. D2D discovery may enable the D2D-enabled UE of a particular user of the social networking application to discover his friends' D2D-enabled UEs or allow for discovery by the friends' D2D-enabled UEs. As another example, D2D discovery may enable discovery of, e.g., shops or restaurants of interest, which are located near the D2D-enabled UE of a particular of a search application. A D2D-enabled UE may discover other nearby D2D-enabled UEs using direct UE-to-UE signaling.

In a conventional method, when discovery is supported for a cell (or serving cell) camping on a carrier F1 to send discovery messages, a UE may obtain discovery resources for sending discovery messages on the F1 carrier from the serving cell on the F1 carrier. The serving cell may broadcast discovery resource configurations in system information block 19 (SIB 19). SIB 19 may deliver resource pools for transmission of discovery messages. A UE may use such resources to send discovery messages in an idle state. When there is no resource pool for transmission or UE is in a connected state, a D2D UE should send a request for resources for sending discovery messages on the F1 carrier to the serving cell on the F1 carrier using dedicated signaling.

In another conventional method, while camping on a serving cell on a carrier F1, a D2D UE may be permitted to send discovery messages on another carrier F2. This may be referred to as inter-carrier discovery communication. Unless discovery is supported by the serving cell on carrier F1 or carrier F1 is a frequency at which a D2D UE desires to send discovery messages, the D2D UE may send discovery messages. The serving cell on carrier F1 may provide an assistance for obtaining resources for discovery transmission on carrier F2. In other words, the serving cell may provide resources for discovery transmission on carrier F2 in SIB 19 or dedicated signaling.

The above information is presented as background information only to assist with an understanding of the present disclosure. No determination has been made, and no assertion is made, as to whether any of the above might be applicable as prior art with regard to the present disclosure.

SUMMARY

An issue with inter-carrier discovery transmission is how a UE is supposed to act when the UE is in the idle state, and a serving cell on carrier F1 does not provide discovery resources for the other carrier F2. The UE enters a connected state and sends a request for resources on carrier F2 to the serving cell on carrier F1. Otherwise, the UE maintains the idle mode, read out SIB 19 on carrier F2, and autonomously obtain resources on carrier F2. In the former case, if the serving cell on carrier F1 offers no assistance, a transition to the connected state may be useless, causing unnecessary signaling for allowing the idle UE to enter into the connected state. In the latter case, unnecessary power consumption may occur.

Another issue with inter-carrier discovery transmission concerns simultaneous transmission on F1 and F2 when the UE is in the connected state on carrier F1 and is conducting wireless wide area network (WAN) communication. When the UE fails to acquire an additional transmission chain, the UE cannot simultaneously perform uplink (UL) transmission to a base station on carrier F1 and discovery transmission on carrier F2. Since uplink transmission is higher in priority, discovery transmission may be skipped by the UE. In order to enhance discovery performance, a discovery TX gap can be generated. The discovery TX gap is a time slot (or subframe) on UL, where the UE need not perform transmission on UL. TX gaps can be added to existing gaps, such as discontinuous reception (DRX). During DRX, the UE need not perform reception on downlink (DL) nor transmission on UL. TX gaps need to be known to base station (or eNB) to prevent the base station from scheduling UL for the UE. For inter-carrier discovery transmission, TX gaps, parameters for signaling TX gaps, and periodicity of TX gap signaling may come at issue. UL transmission timing on carrier F1 and discovery transmission timing on F2 might not be aligned. Subframes for discovery transmission on carrier F2 and subframes for uplink transmission on carrier F1 may not be aligned because discovery transmission on carrier F2 is based on DL timing whereas UL transmission on carrier F1 is based on timing advanced. Further, DL transmission timings on carrier F1 and carrier F2 might not be synced. Accordingly, UE or eNB determining TX gaps for UL subframes corresponding to discovery subframes is a critical issue, and a method is required for UE or eNB to determine TX gaps on carrier F1 corresponding to discovery subframes on carrier F2. Discovery messages may be periodically sent using dedicated resources or contention-based resources. When using contention-based resources, the base station in the serving cell on carrier F1 might not recognize resources (i.e., discovery frames selected by the UE for discovery transmission from a discovery resource pool configured on carrier F2).

To address the above-discussed deficiencies, it is a primary object to provide a method and apparatus for addressing the above-described issues in inter-carrier D2D communication.

Objects of the present disclosure are not limited to the foregoing, and other unmentioned objects would be apparent to one of ordinary skill in the art from the following description.

To achieve the above objects, according to an embodiment of the present disclosure, a method for performing a discovery transmission on a second carrier by a user equipment (UE) served by a primary cell (PCell) on a first carrier, comprises receiving, from a base station, a signaling indicating that the UE read discovery resource configuration for the second carrier on the second carrier or that the UE request the discovery resource configuration for the second carrier from the base station for identifying the discovery resource configuration for the second carrier, and identifying the discovery resource configuration based on the signaling.

To achieve the above objects, according to an embodiment of the present disclosure, a method for performing a discovery transmission on a second carrier by a user equipment (UE) served by a primary cell (PCell) on a first carrier, comprises determining at least one TX gap on the first carrier for the discovery transmission on the second carrier, and transmitting, to a base station, a TX gap request including information on at least one uplink subframe on the first carrier corresponding to the at least one TX gap.

To achieve the above objects, according to an embodiment of the present disclosure, a user equipment (UE) served by a primary cell (PCell) on a first carrier for performing a discovery transmission on a second carrier, comprises a transceiver, and a processor coupled to the transceiver; wherein the processor is configured to receive, from a base station, a signaling indicating that the UE read discovery resource configuration for the second carrier on the second carrier or that the UE request the discovery resource configuration for the second carrier from the base station for identifying the discovery resource configuration for the second carrier and identify the discovery resource configuration based on the signaling.

To achieve the above objects, according to an embodiment of the present disclosure, a user equipment (UE) served by a primary cell (PCell) on a first carrier for performing a discovery transmission on a second carrier, comprising a transceiver, and a processor coupled to the transceiver; wherein the processor is configured to determine at least one TX gap on the first carrier for the discovery transmission on the second carrier, and transmit, to a base station, a TX gap request including information on at least one uplink subframe on the first carrier corresponding to the at least one TX gap.

Details of other embodiments are set forth in the detailed description and the drawings.

Embodiments of the present disclosure present the following effects, at least.

An efficient resource allocation method can be provided for supporting inter-carrier D2D communication.

Further, there is provided an apparatus capable of running an efficient resource allocation method is provided for supporting inter-carrier D2D communication.

The effects of the present disclosure are not limited thereto, and the disclosure encompasses other various effects.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 is a view illustrating a method for configuring a TX gap according to an embodiment of the present disclosure;

FIG. 6 is a view illustrating a method for configuring a TX gap according to an embodiment of the present disclosure;

Throughout the drawings, like reference numerals will be understood to refer to like parts, components, and structures.

DETAILED DESCRIPTION

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Advantages and features of the present disclosure, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims.

Before getting into the detailed description of the present disclosure, particular terms or phrases used herein may be defined merely for ease of description. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of" As used herein, the term "controller" may mean any device, system, or part thereof controlling at least one operation. As used herein, the term "device" may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

Although the terms "first" and "second" are used to describe various components, the components are not limited by the terms. These terms are provided simply to distinguish one component from another. Accordingly, the first component mentioned herein may also be the second component within the technical spirit of the present disclosure.

Although the terms "first" and "second" are used to describe various components, the components are not limited by the terms. These terms are provided simply to distinguish one component from another. Accordingly, the first component mentioned herein may also be the second component within the technical spirit of the present disclosure.

Figure 1:
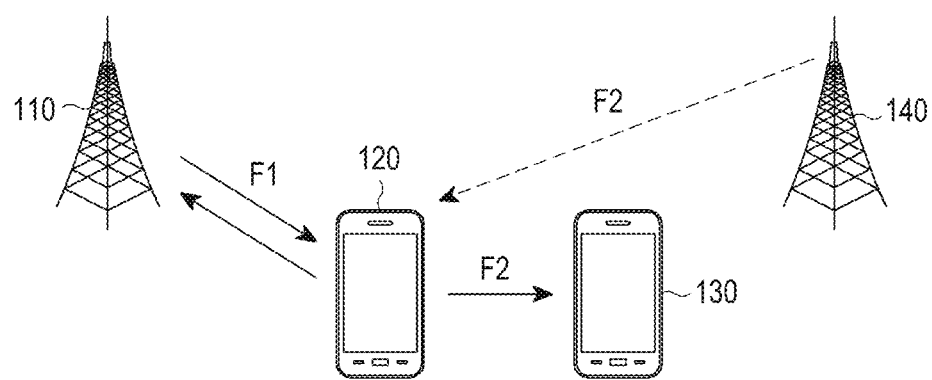
FIG. 1 is a view illustrating a wireless communication environment according to an embodiment of the present disclosure.

FIG. 1 is a view illustrating a wireless communication environment according to an embodiment of the present disclosure. Referring to FIG. 1, a first base station 110 can provide a wide area network (WAN) wireless communication service to devices in its coverage through a carrier with a frequency f1. The first base station 110 can provide wireless communication services using radio access technology (RAT), such as long term evolution (LTE), code division multiple access (CDMA), or global system for mobile communications (GSM), but not limited thereto. The carrier with frequency f1 can be referred to as F1 carrier or carrier F1 or simply as F1. The term "base station" may be replaced with other various terms denoting an entity providing wireless communication service in particular coverage of a network or cell, such as nodeB or evolved nodeB (eNB). In some embodiments, a base station can provide one or more cells. Each cell can mean coverage provided at its center frequency. UE can be served from base station by multiple cells provided from one base station or two or more base stations. Multiple cells serving UE can be divided into a primary cell (PCell) and one or more secondary cells (SCells).

A user equipment (UE) 120 can receive wireless communication service from first base station 110 through a PCell on F1 carrier, and first base station 110 can be a serving base station for UE 120. UE 120 can be any one of a mobile phone, smartphone, personal digital assistant (PDA), laptop computer, net book, or internet of things (IoT) device, but not limited thereto, or can be any device that can receive WAN wireless communication service.

UE 120 can directly communicate with another UE 130 without using WAN. Such direct communication between devices can be denoted device-to-device (D2D) communication. UE 120 should detect that other UE 130 is located adjacent to UE 120 in order to conduct D2D communication. For such detection, UE 120 can send discovery signal (or discovery message), and as other UE 130 located adjacent to UE 120 responds to the discovery signal, D2D communication can begin. Discovery transmission described below may denote transmission of discovery signal (or discovery message). Discovery signal can be sent on an F2 carrier having a frequency f2 different from f1. Transmission of discovery signal using a carrier of a frequency different from a carrier used for communication with serving base station may be denoted inter-carrier discovery transmission. In such case, first base station 110 providing wireless communication service on F1 carrier may or may not support transmission of discovery signal on F2 carrier. A need exists for methods for sending discovery signals according to whether first base station 110 supports transmission of discovery signal on F2 carrier.

A second base station 140 which is a non-serving base station for UE 120 can provide wireless communication service through F2 carrier. Second base station 140 can support transmission of discovery signal on F2 carrier. In such case, a need also exists for methods for sending discovery signals using transmission of discovery signal on F2 carrier by second base station 140. In some embodiments, second base station 140 can also be a serving base station for UE 120. In such case, second base station can provide SCell to UE 120 through F2 carrier. In some embodiments, the first base station 110 can provide UE with a PCell on F1 carrier and a SCell on F2 carrier. In such case, the first base station 110 and the second base station (140) can be a single entity.

Supporting by a base station discovery transmission of a UE can include signaling a configuration of resources for transmission of discovery signal (hereinafter, discovery resources) to the UE. Unless the serving base station on F1 carrier signals discovery resource configuration for F2 carrier, the UE in a radio resource control (RRC) idle state can select one of the following two options.

In the first option, the UE can attempt to read out system information block 19 (SIB 19) broadcast on F2 carrier. The UE can obtain the discovery resource configuration for F2 carrier by reading out SIB 19 and send discovery signal using the obtained resource configuration. System information block 19 (SIB 19) sent on F2 carrier can be transmitted from a base station (e.g., the base station 140 of FIG. 1) other than the serving base station. In the first option, discovery transmission and cell detection (i.e., detection of base station on F2 carrier) on F2 carrier might not influence WAN operation. In some embodiments, the UE can attempt to read out SIB 19 sent on F2 carrier when the following conditions are met for the base station on F2 carrier.

Srxlev>0 and Squal>0
Here, $Srxlev = Q_{rxlevmeas} - (Q_{rxlevmin} + Q_{rxlevminoffset}) - P$compensation, $Squal = Q_{qualmeas} - (Q_{qualmin} + Q_{qualminoffset})$, and Srxlev, cell selection RX level (decibel (dB))
Squal, cell selection quality (dB)
$Q_{rxlevmeas}$, measured cell RX level (RSRP)
$Q_{qualmeas}$, measured cell quality (reference signal received quality (RSRQ))
$Q_{rxlevmin}$, minimum RX level required in cell (decibel milliwatts (dBm))
$Q_{qualmin}$, minimum quality level required in cell (dB)
$Q_{rxlevminoffset}$, offset for signaled $Q_{rxlevmin}$ considering Srxlev assessment as a result of periodic discovery on higher-priority public land mobile network (PLMN) while normally camping on visited PLMN (VPLMN)
$Q_{qualminoffset}$, offset for signaled $Q_{qualmin}$ considering Squal assessment as a result of periodic discovery on higher-priority PLMN while normally camping on VPLMN
Pcompensation, $\max(P_{EMAX} - P_{PowerClass}, 0)$ (dB)
$P_{EMAX}$, maximum TX power level (dBm) available to UE upon uplink transmission in cell defined as $P_{EMAX}$ in TS 36.101
$P_{PowerClass}$, maximum RF output power (dBm) of UE as per UE power class as defined in TS 36.101.

In the second option, UE can send a discovery resource configuration for serving base station. UE should enter a RRC connected state to send a request for discovery resource configuration to the serving base station. UE can send a request for discovery resource configuration to the serving base station through F1 carrier, and in response thereto, the serving base station can provide UE with a discovery resource configuration on F2 carrier through dedicated signaling instead of SIB 19. However, unless the serving network or serving base station provides discovery resource configuration through dedicated signaling, it may be useless that UE enters the RRC connected state and requests discovery resource configuration for discovery transmission on F2 carrier. Since the serving network or serving base station may recognize whether it can provide an assistance (i.e., discovery resource configuration) for inter-carrier discovery transmission, it can be preferable to allow the serving network or serving base station to control UE to select one of the above-described two options for inter-carrier discovery transmission.

In some embodiments, the base station provides an indication to UE for UE to select one of the two options in order for UE to obtain discover resource configuration for F2 carrier. Specifically, the serving base station sends an indication as to whether UE should read out SIB (e.g., SIB 19) on F2 carrier or UE should send a request for discovery resource configuration for F2 carrier to the serving cell. UE obtains a discovery resource configuration for F2 carrier based on the received indication. The base station uses a one-bit indicator in the dedicated signaling or broadcast signaling (i.e., SIB 19) to instruct UE to select one of the two options. The dedicated signaling or the broadcast signaling can be transmitted by the base station on F1 carrier.

In some embodiments, if the base station does not broadcast the discovery resource configuration for F2 carrier on F1 carrier, the base station indicates UE to select one of the two options.

In some embodiments, the base station, unless discovery resource configuration for F2 carrier is included in SIB 19 on F1 carrier, provides an indication to UE as to whether UE should select the second option, using the one-bit indicator in the broadcast signaling (i.e., SIB 19) or dedicated signaling. In some embodiments, unless there is the one-bit indicator, UE selects the first option. In some embodiments, the one-bit indicator indicates whether an assistance (i.e., discovery resource configuration) for inter-carrier discovery transmission is provided to the base station. In some embodiments, unless SIB 19 is broadcast on F1 carrier by the serving base station, UE uses the second option.

In some embodiments, the (broadcast or dedicated) signaling transmitted by the base station for indicating UE to select one of the two options can also comprise indication for other carriers (e.g., F3 carrier, F4 carrier) in addition to F2 carrier. For example, the signaling can comprise an indication as to whether UE should read out SIB (e.g., SIB 19) on F3 carrier or UE should send a request for discovery resource configuration for F3 carrier to the serving cell, in order for UE to obtain discover resource configuration for F3 carrier.

An example of the signaling for the serving base station to instruct UE to select one of the two options is as follows.

```
SL-CarrierFreqInfo-v13x0::=    SEQUENCE {
    discTxResources-r13        CHOICE
        acquireSI-FromCarrier-r13    NULL,
        discTxPoolCommon-r13         SL-DiscTxPoolListNFreq-r13,
        requestDedicated-r13         NULL
        noTxOnCarrier-r13            NULL
    }                                            OPTIONAL,  -- Need OR
    discRxResources-r13        SL-DiscRxPoolListNFreq-r13   OPTIONAL   -- Need OR
}
```

On each frequency, the base station can signal one of the following. TX resource pools (discTXPoolCommon-r13), indication (acquireSI-FromCarrier-r13) for reading out SIB 19 to obtain resources from the carrier of the frequency, indication (requestDedicated-r13) for sending a request for dedicated resources to serving cell, or indication (noTxOn-Carrier) for banning transmission of discovery signal on carrier of the frequency. A list of the frequencies can be signaled separately from the above signaling, and the number of entries in SL-CarrierFreqInfo-v13x0 can be the same as the number of frequencies in the frequency list. There can be one to one mapping between the entries in SL-CarrierFreqInfo-v13x0 and the frequencies of the frequency list. The Nth entry in SL-CarrierFreqInfo-v13x0 corresponds to the Nth frequency in frequency list.

Now described is a method for processing TX gap for discovery transmission.

When UE does not have an additional TX chain for discovery transmission, UE cannot simultaneously conduct discovery transmission on F2 carrier and uplink transmission on F1 carrier. RRC-connected UE requests the serving base station to prevent uplink from being scheduled in subframes on F1 carrier overlapping subframes (i.e., discovery subframes) for discovery transmission on F2 carrier by sending a request for TX gap. Alternately, RRC-connected UE can request the serving base station to allow UE to prioritize discovery transmission over UL transmission in subframes on F1 carrier overlapping with subframes (i.e., discovery subframes) for discovery transmission on F2 carrier by sending a request for TX gap. During TX gap, UE assigns a higher priority to discovery transmission than to uplink transmission. When UE does not conduct discovery transmission in TX gap, UE conducts uplink transmission. If UE is configured with multiple cells in the serving base station, UE can transmit request for gap on PCell.

Figure 2:
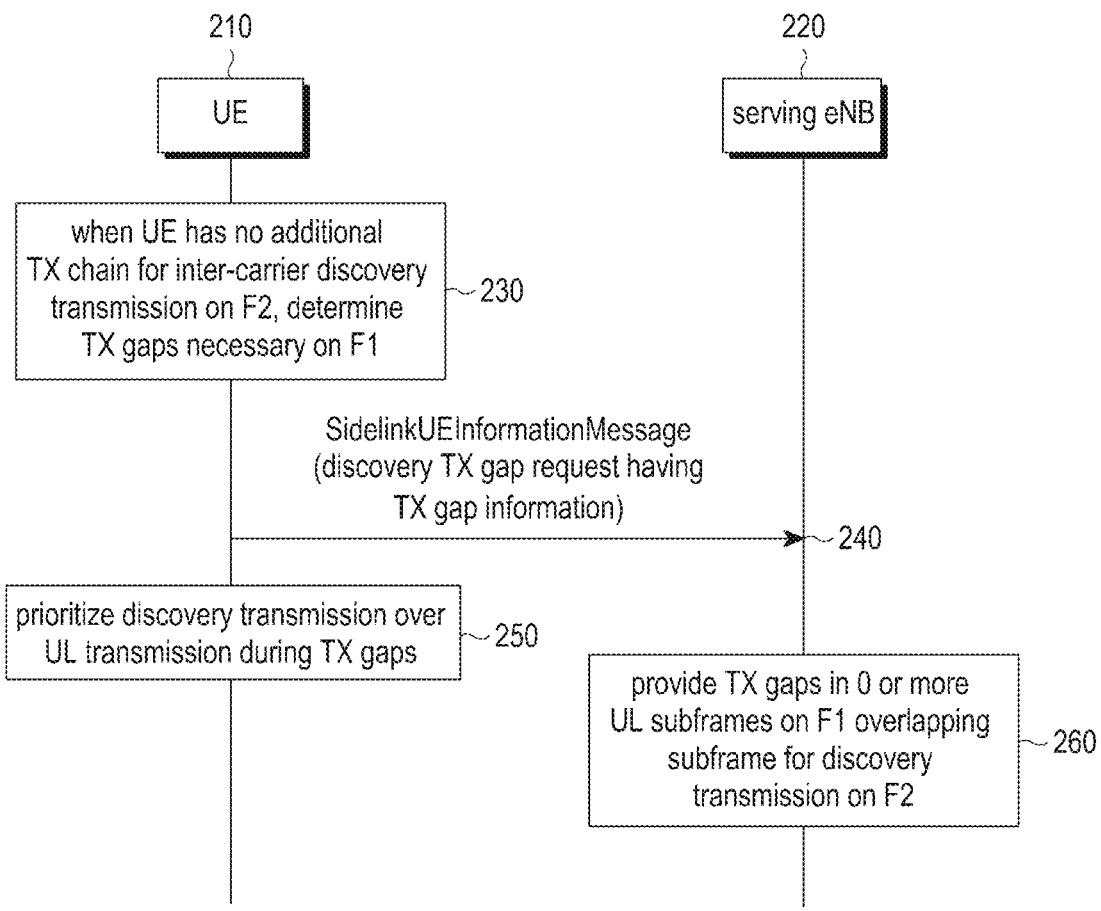
FIG. 2 is a flowchart illustrating a process for configuring a TX gap according to an embodiment of the present disclosure.

A method for configuring a TX gap is described below in greater detail with reference to FIG. 2. FIG. 2 is a flowchart illustrating a process for configuring a TX gap according to an embodiment of the present disclosure.

Referring to FIG. 2, UE 210 determines TX gaps necessary on F1 when UE does not have an additional TX chain for inter-carrier discovery transmission (230). UE sends a request for discovery TX gap having information on the determined TX gaps to serving eNB 220 (240). The information on the determined TX gaps comprises frequency of F2 carrier and parameters indicating the determined TX gaps on F2 carrier. The discovery TX gap request can be sent through a SidelinkUEInformation message. UE 210 puts priority to discovery transmission on F2 rather than UL transmission on F1 during TX gaps (250). In some embodiments, if subframe for discovery transmission on F2 overlaps with UL TX on F1 during the TX gap and UL TX on F1 is not related to random access procedure (e.g., RACH preamble transmission or MSG3 transmission) then UE prioritize to transmit discovery over UL transmission. If subframe for discovery transmission on F2 overlaps with UL TX on F1 during the TX gap and UL TX on F1 is related to random access procedure (e.g., RACH preamble transmission or MSG3 transmission) then UE prioritize UL transmission over discovery transmission in that subframe. Serving eNB 220, upon receiving the discovery TX gap request, provides TX gaps in 0 or more UL subframes on F1 that can overlap subframe for discovery transmission on F2 (260).

In some embodiments, serving eNB does not provide a gap for all of the subframes indicated by UE in the TX gap request. In some embodiments, serving eNB abstains from providing a response (i.e., TX gap response) to the TX gap request. When subframe for discovery transmission on F2 overlaps UL TX on F1 during TX gap, UE conducts discovery transmission before UL transmission. Alternatively, when subframe for discovery transmission F2 overlaps UL TX on F1 except for sounding reference signal (SRS) and physical uplink control channel (PUCCH) during TX gap, UE sends discovery signal. RRC-connected UE monitors downlink (physical downlink control channel (PDCCH) or enhanced PDCCH (EPDCCH)) and monitors whether UL is scheduled or not in subframes on F1 (on physical uplink shared channel (PUSCH)) corresponding to discover subframes for discovery transmission on F2. Data on PUSCH can be dynamically scheduled, and scheduling information can be indicated in PDCCH or EPDCCH. UE can also be scheduled to send control information on PUCCH for feedback of scheduling request (SR) or hybrid automatic repeat request (HARD). When type 1 resource is allocated in order to avoid collision between transmission of PUCCH, SRS, or physical random access channel (PRACH) of UE on F1 carrier and discovery transmission on F2 carrier, UE excludes discovery subframes on F2 carrier overlapping PUCCH, SRS, or PRACH transmission on F1 carrier before selecting resources for discovery transmission from the discovery resource pool. Here, type 1 resource allocation means a discovery resource allocation scheme in which a particular discovery resource pool for UE among multiple discovery resource pools is allocated to UE by base station, and UE selects resource (i.e., subframe) for discovery transmission from the allocated discovery resource pool. Meanwhile, type 2 resource allocation means a discovery resource allocation scheme in which dedicated discovery resource is allocated to UE by base station.

Figure 3:
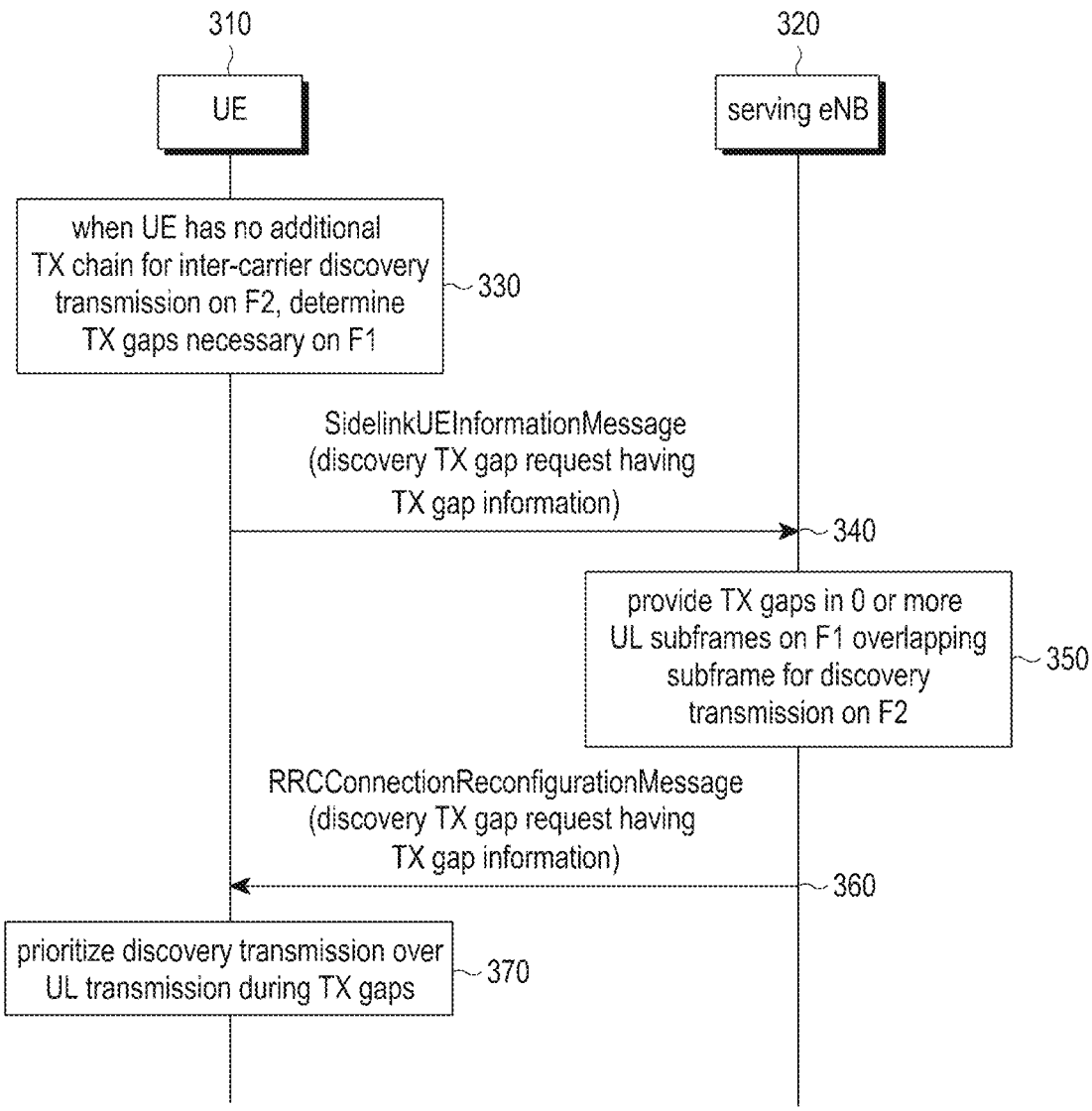
FIG. 3 is a flowchart illustrating a process for configuring a TX gap according to an embodiment of the present disclosure.

Another method for configuring a TX gap is described below with reference to FIG. 3. FIG. 3 is a flowchart illustrating a process for configuring a TX gap according to an embodiment of the present disclosure.

In FIG. 3, operations 330, 340, 350, and 370, respectively, are substantially the same in description as operations 230, 240, 260, and 370 of FIG. 2. In operation 360, serving eNB 320 sends a TX gap response including information on TX gaps allocated by the serving eNB 320 to UE 310. The information on TX gaps includes frequency of F2 carrier and parameters indicating TX gaps allocated on F2 carrier. The TX gap response can be delivered through a RRCConnection Reconfiguration message.

In an embodiment, the TX gap response indicates whether UE's request (i.e., discovery TX gap request) is accepted. The presence of TX gaps in the TX gap response indicates that UE's request is accepted. When accepted (i.e., TX gaps are provided in the TX gap response), UE need not perform UL transmission in TX gaps which are UL subframes signaled by UE in the TX gap request, and discovery transmission has priority over UL transmission during TX gaps.

In another embodiment, the TX gap response indicates whether UE's request is accepted. When accepted, eNB gives an indication of TX gaps (i.e., UL subframes where UE need not do UL transmission) to UE, or discovery transmission can have priority over UL transmission. The TX gap response can be sent on F1 carrier by serving eNB albeit no request is made (unsolicited) (i.e., without TX gap request). For example, when serving eNB on F1 carrier allocates dedicated resources for discovery transmission on F2 carrier, the TX gap response can be sent despite unsolicited.

In another embodiment, the TX gap response can give UE an indication that UE need not perform UL transmission in the TX gaps (i.e., UL subframes corresponding to discovery subframes for discovery transmission on F2 carrier). UE may be already aware of discovery subframes used for discovery transmission.

In another embodiment, the TX gap response can give UE an indication that UE need not perform UL transmission in the TX gaps (i.e., UL subframes corresponding to discovery subframes for discovery transmission on F2 carrier), i.e., that discovery transmission has priority over UL transmission.

In some embodiments, UE sends a TX gap request only when type 1 resource allocation scheme is used for discovery transmission. When type 2 resource allocation scheme is used, serving eNB on F1 carrier, because of being aware of discovery resources used by UE for discovery transmission on F2 carrier, determines TX gaps even when no TX gap request is made.

In some embodiments, UE also sends a TX gap request regardless of resource allocation schemes (whether it is of type 1 or type 2).

In some embodiments, UE sends a TX gap request for all of the discovery subframes in the discovery resource pool allocated to UE. In some embodiments, UE sends a request for TX gaps for subframes allocated to UE for discovery transmission or discovery subframes selected by UE. In some embodiments, eNB provides TX gaps corresponding to one or more subframes, and UE selects one of them for discovery transmission.

A method for determining TX gap by UE is now described.

UE sends information on TX gaps (i.e., one or more subframes where serving eNB should abstain from scheduling UL or UE should not be expected to conduct any UL transmission) to serving eNB. UE recognizes discovery subframes on F2 carrier carrying discovery messages, and UE can thus determine TX gaps corresponding to discovery subframes.

While discovery transmission on F2 carrier is based on DL timing, uplink transmission on F1 carrier is based on timing advanced, and thus, discovery transmission on F2 carrier and uplink transmission on F1 carrier might not be aligned. Further, DL transmission timing on F1 carrier and DL transmission timing on F2 carrier might not be synced. This is described in more detail with reference to FIG. 4.

Figure 4:
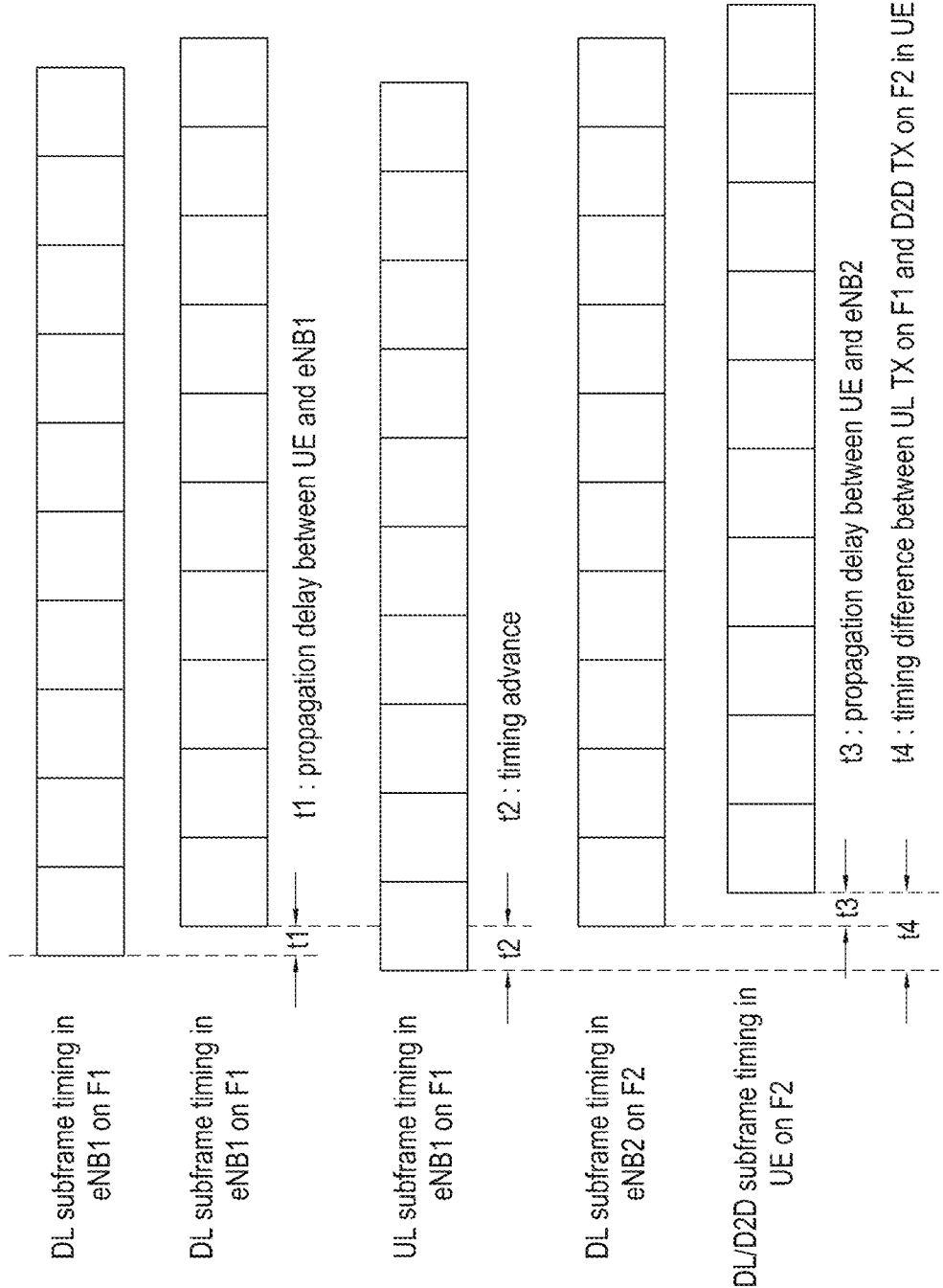
FIG. 4 is a view illustrating the timing of DL and UL subframes on F1 and F2.

FIG. 4 is a view illustrating the timing of DL and UL subframes on F1 and F2. In FIG. 4, eNB1 is a serving base station for UE and uses F1 carrier, and eNB2 is a base station on F2 carrier. The DL subframe in UE on F1 carrier can come behind, by t1, DL subframe timing in eNB1 on F1 carrier. The value t1 is a propagation delay between UE and eNB1. UL subframe timing on F1 carrier in UE can come ahead, by t2, of DL subframe timing in eNB on F1 carrier. The value t2 is a timing advance. DL subframe timing in eNB2 on F2 carrier might not be identical to DL subframe timing on F1 carrier due to a sync failure. The DL/D2D subframe timing in UE on F2 carrier can come behind, by t3, DL subframe timing in eNB2 on F2 carrier. The value t3 is a propagation delay between UE and eNB2. Resultantly, a gap of t4 exists between UL subframe timing in UE on F1 carrier and DL/D2D subframe timing on F2 carrier.

Regarding the start time of UL subframe on F1 carrier, UE determines a time gap (i.e., t4) for D2D subframe on F2 carrier. The method for configuring TX gap can be varied by t4, which is described below in more detail with reference to FIGS. 5 to 7.

Figures 5, 6:
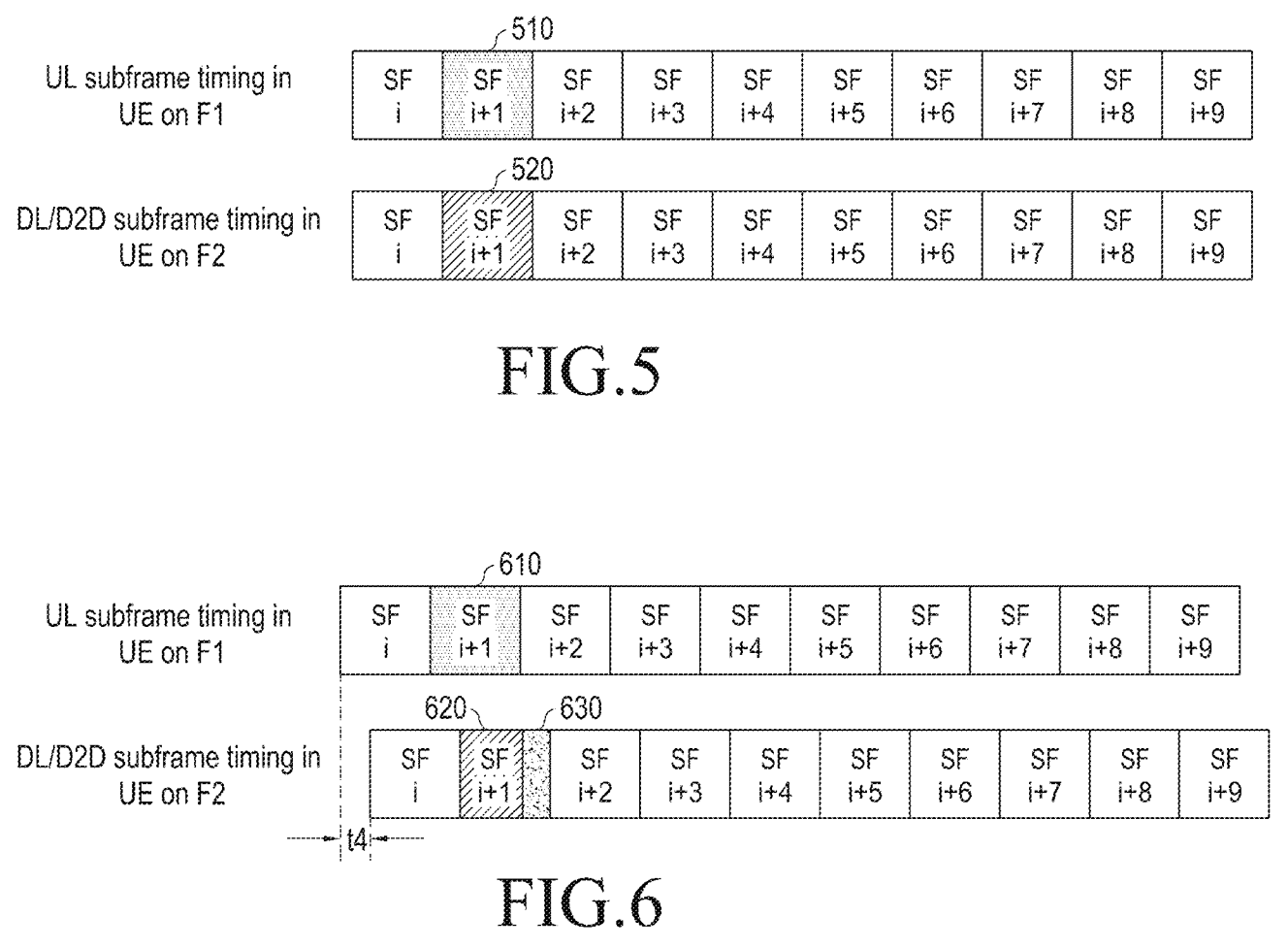

FIG. 5 is a view illustrating a method for configuring a TX gap, particularly when t4 is 0, according to an embodiment of the present disclosure. Since t4 is 0, when discovery signal is transmitted in UL subframe i+1 520 in UE on F2 carrier, TX gap is required only in UL subframe i+1 510 on F1 carrier. That is, when t4 is 0, only one UL subframe can be required on F1 carrier where TX gap is configured for each discovery subframe on F2 carrier.

FIG. 6 illustrates a method for configuring TX gap according to another embodiment, particularly when t4 is the same as gap 630 at the end of the subframe for D2D transmission on F2 carrier. Gap can be configured between subframes for DL or D2D transmission on F2 carrier as well. When t4 is the same as gap 630 at the end of subframe for D2D transmission on F2 carrier, substantially no signal is sent from UE during gap 630, and thus, when discovery signal is sent in UL subframe i+1 620 in UE on F2 carrier, TX gap is required only in UL subframe i+1 610 on F1 carrier. That is, when t4 is the same as gap 630 at the end of subframe for D2D transmission on F2 carrier, only one UL subframe can be required on F1 carrier where TX gap is configured for each discovery subframe on F2 carrier, and this is also true for where t4 is less than gap 630 at the end of subframe for D2D transmission on F2 carrier.

Figure 7:
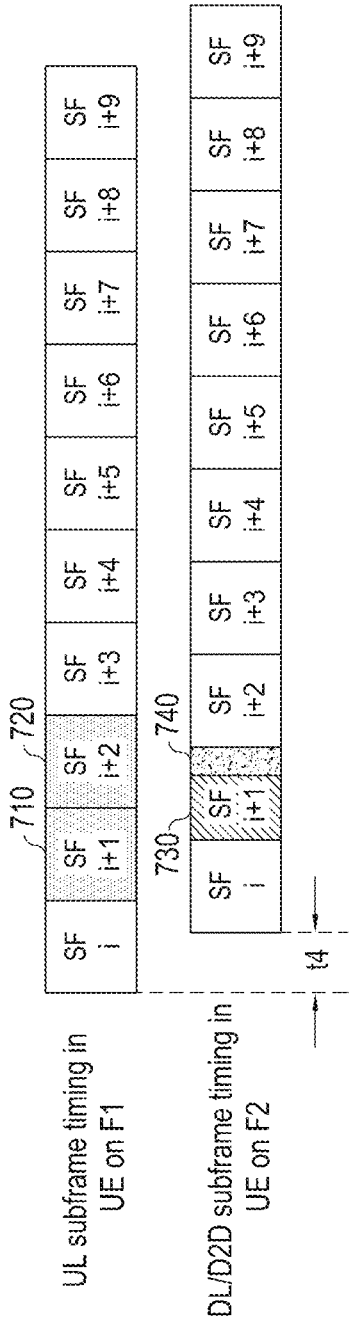
FIG. 7 is a view illustrating a method for configuring a TX gap according to an embodiment of the present disclosure.

FIG. 7 illustrates a method for configuring TX gap according to another embodiment, particularly when t4 is larger than gap 740 at the end of the subframe for D2D transmission on F2 carrier. When t4 is larger than gap 740 at the end of subframe for D2D transmission on F2 carrier, TX gaps can be configured in UL subframe i+1 710 and subframe i+2 720 on F1 carrier temporally overlapping region except for gap 740 in subframe i+1 730 on F2 carrier in order to insure discovery transmission in D2D subframe i+1 730 on F2 carrier.

In some embodiments, regardless of what is shown in FIGS. 5 to 7, UE determines necessary TX gap in UL subframe on F1 carrier which starts or ends during discovery subframe on F2 carrier. In some embodiments, regardless of what is shown in FIGS. 5 to 7, UE determines necessary TX gap in UL subframe on F1 carrier which starts or ends during discovery subframe on F2 carrier or at the boundary of discovery subframe. Such embodiments can be useful for when UE is on the move, and after UE determines TX gaps, t4 varies.

In some embodiments, TX gap in UL subframe on F1 carrier determined by the above-described schemes can be required only when UL subframe determined as TX gap is not configured as D2D subframe in F1 carrier.

In some embodiments, determination of TX gaps can be made by UE regardless of whether dedicated resources (i.e., type 2 resource allocation or scheduled resource allocation) or contention-based resources (i.e., type 1 resource allocation or UE selection resource allocation) are used for discovery transmission on F2 carrier. In some embodiments, determination of TX gaps can be performed by UE when contention-based resources (i.e., type 1 resource allocation or UE selection resource allocation) are used for discovery transmission on F2 carrier.

In some embodiments, additional subframes or times other than subframe where UE sends discovery signal can be considered in determining TX gaps. For example, subframes on F2 carrier for transmission of device to device sync signal and interruption time for retuning from F1 carrier to F2 carrier or from F2 carrier to F1 carrier, as well as one or more subframes for transmission of discovery signal (i.e., one or more subframes on F2 carrier where discovery resources for discovery transmission are configured) should be taken into account for determining TX gap. Subframe offset between subframes on carrier F1 and carrier F2 should also be taken into account when determining the TX gaps. The same can be individually signaled in TX gap request. Alternatively, the same can be indicated as TX gap.

A method for determining TX gap by eNB is described below.

UE sends information on discovery subframes on F2 carrier to serving eNB, or otherwise, serving eNB may already recognize discovery subframes used by UE for discovery transmission. In such case, serving eNB needs to determine TX gaps on F1 carrier. In some embodiments, serving eNB has signaled discovery subframes used by UE for discovery transmission and can thus be aware of them.

In some embodiments, UE determines a difference (i.e., t4) in start time between D2D subframe on F2 carrier and UL subframe on F1 carrier. UE sends information on t4 to eNB at a TX gap request. eNB determines a value obtained by subtracting t1 from the start time of DL subframe on F1 carrier in eNB as the start time of UL subframe on F1 carrier in UE. The value of time t1 has been known to eNB. The eNB determines a value obtained by subtracting t4 from the start time of UL subframe on F1 carrier in UE as the start time of D2D subframe on F2 carrier in UE. Thereafter, eNB determines TX gaps using the same method as that performed by UE before.

In some embodiments, a value obtained by subtracting t1 from the start time of DL subframe on F1 carrier in eNB can be determined as the start time of UL subframe on F1 carrier in UE. The value of time t1 has been known to eNB. Thereafter, eNB determines a difference in start time between UL subframe on F1 carrier in UE and DL subframe on F2 carrier. The start of DL subframe on F2 carrier in UE can be regarded as start of discovery subframe on F2 carrier. Since eNB can be aware of offset between DL transmission timings on F1 carrier and F2 carrier, the start time of DL subframe on F2 carrier can have been known to eNB. The eNB determines that TX gap is needed in UL subframe on F1 carrier that starts or ends during discovery subframe on F2 carrier or at the boundary of discovery subframe on F2 carrier.

In some embodiments, eNB regards the start of D2D transmission timing on F2 carrier as DL timing on F1 carrier, and eNB determines that TX gap is needed in UL subframe on F1 carrier that starts or ends during discovery subframe on F2 carrier or at the boundary of discovery subframe on F2 carrier.

In some embodiments, TX gaps can be computed by UE or eNB for discovery subframes actually sent by UE. In other embodiments, TX gaps can be computed for each discovery subframe in discovery resource pool.

Periodicity of TX gap request is described below.

The periodicity of TX gap request can be varied depending on methods for configuring discovery resources.

There can be a number of TX resource pools, and a TX resource pool can be selected based on RSRP. In such case, UE may have to reselect resource pool when RSRP is varied. As a result, resources for discovery transmission may be varied in each discovery period. Whether a new resource pool needs to be selected or not can be based on RSRP measurement before discovery period. Accordingly, UE might not send a TX gap request on multiple discovery periods. UE may have to send a TX gap request in each discovery period.

There may be a number of TX resource pools, and a TX resource pool can be randomly selected. In such case, UE selects resource pool and resources for multiple discovery periods. Accordingly, UE sends one TX gap request every "N" discovery periods.

There may be a single TX resource pool. In such case, UE may have to randomly select resources for each transmission in each discovery period. As a result, resources selected for discovery transmission may be varied in each discovery period. UE can randomly select resources for multiple discovery periods and send one TX gap request every "N" discovery periods.

TX gap signaling parameters are now described.

TX gap signaling parameters can be used to indicate TX gaps in TX gap request. UE sends one discovery message in each discovery period. Each discovery protocol data unit (PDU) can be sent multiple times in discovery period, and accordingly, TX gap for multiple subframes may be needed. Since discovery subframes may be varied in discovery period, TX gaps may also be varied. Accordingly, TX gaps can be signaled using subframe bitmap.

According to an embodiment of the present disclosure, the following parameters can be used to signal TX gaps at TX gap request.

TX gap period, periodicity of TX gaps offset, difference between start of first TX gap period and SFN=0

TX gap list, includes one or more elements in list, and each element includes SubframeBitMap or SubframeBitMapOffset.

SubframeBitMap, variably sized bitmap. The nth SubframeBitMap in the TX gap list corresponds to the nth gap interval subsequent to gap interval where TX gap request is sent. Each bit indicates whether subframe is TX gap or not.

SubframeBitMapOffset, offset between start of TX gap period and first subframe indicated by SubframeBitMap. SubframeBitMapOffset might not be present in the first element in list. In some embodiments, SubframeBitMapOffset may be present in none of the elements.

Figure 8:
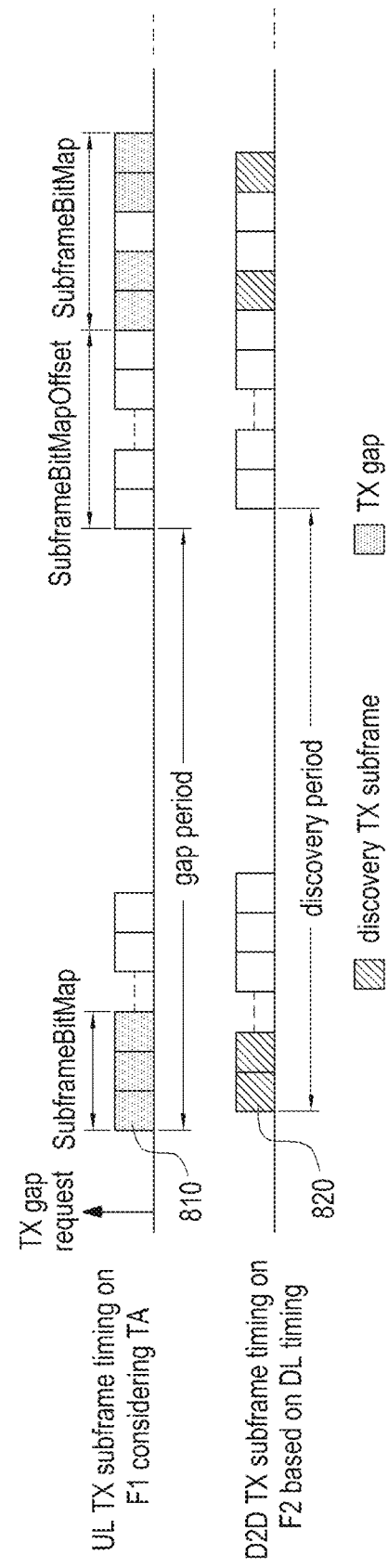
FIG. 8 is a view illustrating TX gap signaling parameters according to an embodiment of the present disclosure.

This is described in more detail with reference to FIG. 8. FIG. 8 is a view illustrating TX gap signaling parameters according to an embodiment of the present disclosure. Referring to FIG. 8, TX gap period can denote the length of TX gap period corresponding to discovery period and can be indicated in unit of subframe. SubframeBitMap can indicate whether at least some of subframes in a corresponding TX gap period are TX gap or not. When TX gaps 810 corresponding to discovery TX subframes 820 are configured in first three subframes in the gap period as shown in FIG. 8, SubframeBitMap can be configured in three bits, and SubframeBitMapOffset might not be present. In a gap period subsequent to the gap period shown in FIG. 8, SubframeBitMapOffset can denote periods from the start timing of the corresponding gap period to subframe indicated by SubframeBitMap and can be indicated in unit of subframe.

According to an embodiment of the present disclosure, the following parameters can be used to signal TX gaps at TX gap request.

TX gap list, includes one or more elements in list, and each element includes SubframeBitMapStart or SubframeBitMap.

SubframeBitMapStart, subframe # of subframe corresponding to most significant bit of SubframeBitMap. In some embodiments, system frame number (SFN) can be indicated instead of subframe #.

SubframeBitMap, variably sized bitmap. The most significant bit (MSB) of SubframeBitMap corresponds to subframe indicated by SubframeBitMapStart. Each bit indicates whether subframe is TX gap or not.

Figure 9:
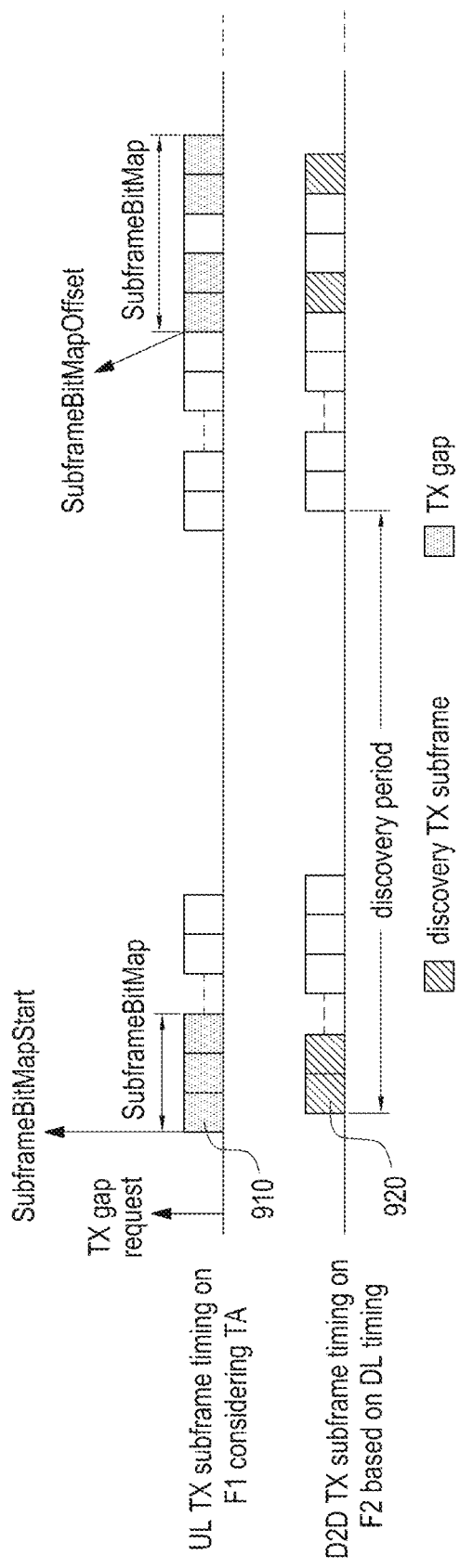
FIG. 9 is a view illustrating TX gap signaling parameters according to an embodiment of the present disclosure.

This is described in more detail with reference to FIG. 9. FIG. 9 is a view illustrating TX gap signaling parameters according to an embodiment of the present disclosure. Referring to FIG. 9, SubframeBitMapStart may denote the first subframe (i.e., subframe corresponding to MSB of SubframeBitMap) of subframes indicated by SubframeBitMap indicating TX gaps 910 corresponding to discovery TX subframes 920.

According to another embodiment of the present disclosure, the following parameters can be used to signal TX gaps at TX gap request.

One or more lists of SubframeBitMap and SubframeBitMapOffset

SubframeBitMap, variably sized bitmap. Each bit indicates whether subframe is TX gap or not.

SubframeBitMapOffset, offset from SFN=0 of the first subframe indicated by SubframeBitMap.

According to another embodiment of the present disclosure, the following parameters can be used to signal TX gaps at TX gap request.

One or more lists of SFN and SubframebitMap

SubframebitMap (10 bits), each bit corresponds to subframe in SFN. MSB corresponds to subframe of SFN.

According to another embodiment of the present disclosure, the following parameters can be used to signal TX gaps at TX gap request.

TX gap period, periodicity of TX gaps offset, difference between start of first TX gap period and SFN=0

TX gap list, includes one or more elements in list, and each element includes SubframeBitMapList.

SubframeBitMapList, variably sized bitmap list. The nth SubframeBitMapList corresponds to the nth gap interval subsequent to gap interval where TX gap request is sent. Each element in SubframeBitMapList includes SubframeBitMap and SubframeBitMapOffset.

SubframeBitMap, variably sized bitmap. The nth SubframeBitMap in list corresponds to the nth gap interval subsequent to gap interval where TX gap request is sent. Each bit indicates whether subframe is TX gap or not.

SubframeBitMapOffset, offset between start of TX gap period and first subframe indicated by SubframeBitMap. SubframeBitMapOffset might not be present in the first element in list. In some embodiments, SubframeBitMapOffset may be present in none of the elements.

According to another embodiment of the present disclosure, the following parameters can be used to signal TX gaps at TX gap request.

TX gap list, includes one or more lists of SubframeBitMapStart and SubframeBitMapList.

SubframeBitMapStart, subframe # of subframe corresponding to most significant bit of SubframeBitMap. In some embodiments, system frame number (SFN) can be indicated instead of subframe #.

SubframeBitMapList, variably sized bitmap list. Each element in SubframeBitMapList includes SubframeBitMap and SubframeBitMapOffset.

SubframeBitMap, variably sized bitmap. The first subframe bitmap begins in the subframe number indicated in SubframeBitMapStart. For the rest, subframe bitmap starts at the offset (SubframeBitMapOffset) from the last subframe indicated by a previous subframe bitmap. Each bit indicates whether subframe is TX gap or not.

SubFrameBitMapOffset, indicates offset of start of SubFrameBitMap for previous bitmap in list. Offset can be indicated as the number of subframes or frames. In some embodiments, SubFrameBitMapOffset might not be present for the first element in SubFrameBitMapList. In some embodiments, SubFrameBitMapOffset can be present in the first element in SubFrameBitMapList, and offset of start of subframe bitmap can be indicated from the subframe/frame number indicated by SubFrameBitMapStart.

Figure 10:
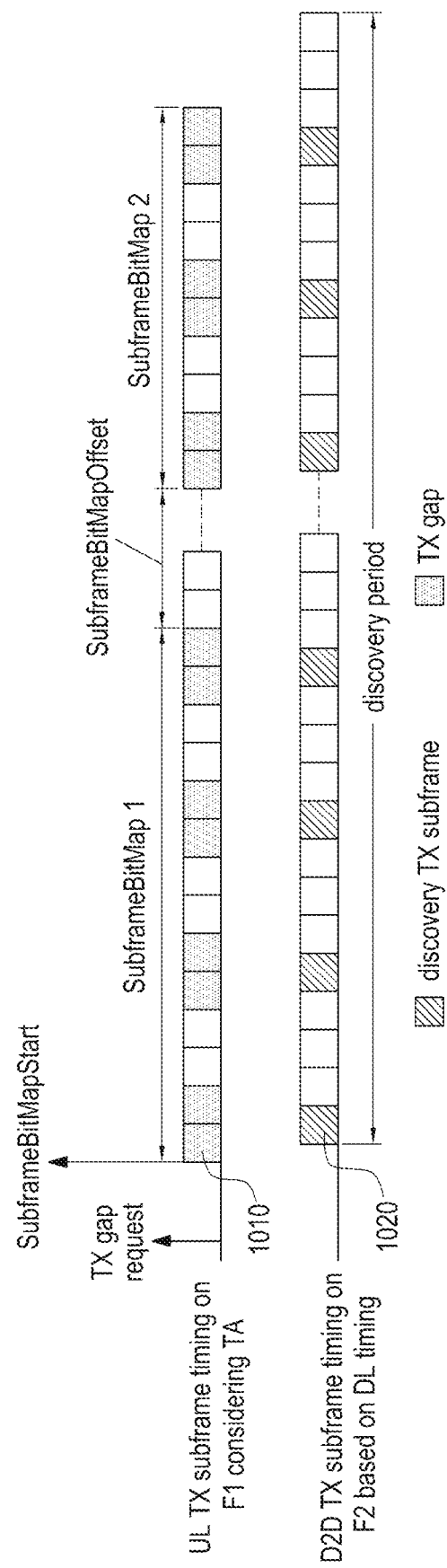
FIG. 10 is a view illustrating TX gap signaling parameters according to an embodiment of the present disclosure.

This is described in more detail with reference to FIG. 10. FIG. 10 is a view illustrating TX gap signaling parameters according to an embodiment of the present disclosure. Referring to FIG. 10, SubFrameBitMapStart indicates the first subframe among subframes where whether TX gap or not is indicated by the first SubFrameBitMap(SubframeBitMap1). SubFrameBitMapOffset denotes an interval between SubFrameBitMap1 and SubFrameBitMap(SubFrameBitMap2) subsequent to SubFrameBitMap1.

In some embodiments, UE signals a one-bit indicator indicating whether adjacent subframes corresponding to TX gap signaled in TX gap request should also be TX gap.

UE reports TX gaps using the above-described signaling parameters on each frequency where UE independently send discovery signal or UE indicates TX gap on all frequencies. For example, UE can send discovery signal on F1 carrier and F2 carrier. UE can have serving cell on F3 carrier and F4 carrier. Accordingly, UE can independently report TX gaps on F1 carrier and F2 carrier. Alternatively, UE combines gaps necessary for F1 carrier and F2 carrier and report the combined gaps in TX gap request. While sending TX gap request, UE indicates serving cell or frequency (or carrier) requiring TX gap. UE can also indicate frequency on which UE want to transmit discovery signal. For example, when discovery transmission on F1 carrier requires gap on serving frequency F3, UE can indicate gap necessary on frequency F3. In other embodiments, UE might not report frequency, and gap can be applied to all serving cells or serving frequencies.

The above-described signaling parameters can also be available to eNB for configuring TX gaps.

RSRP measurement for inter-carrier discovery transmission is described below.

Type 1 discovery resource allocation including multiple resource pools and in which resource pool selection is based on RSRP may be available for discovery transmission. In such case, UE needs to measure RSRP for F2 carrier where discovery signal is sent for selecting resource pool. Resources for F2 carrier can be configured by serving cell on F1 carrier. Alternatively, resources for F2 carrier can be obtained by UE reading out SIB (i.e., SIB 19) on F2 carrier.

For discovery resource allocation, Pcell (or serving cell or serving eNB) can indicate DL carrier available for selecting pool using parameter UseRSRPPcell, carrier index, or absolute radio-frequency channel number (ARFCN). Such indication can be achieved for each carrier supportive of discovery transmission. Alternatively, a list of carriers where Pcell's RSRP is available can be indicated in SIB 19. Unless RSRP of Pcell is available for discovery on F2 carrier, Pcell can configure measurement gap. This is described in more detail with reference to FIG. 11.

Figure 11:
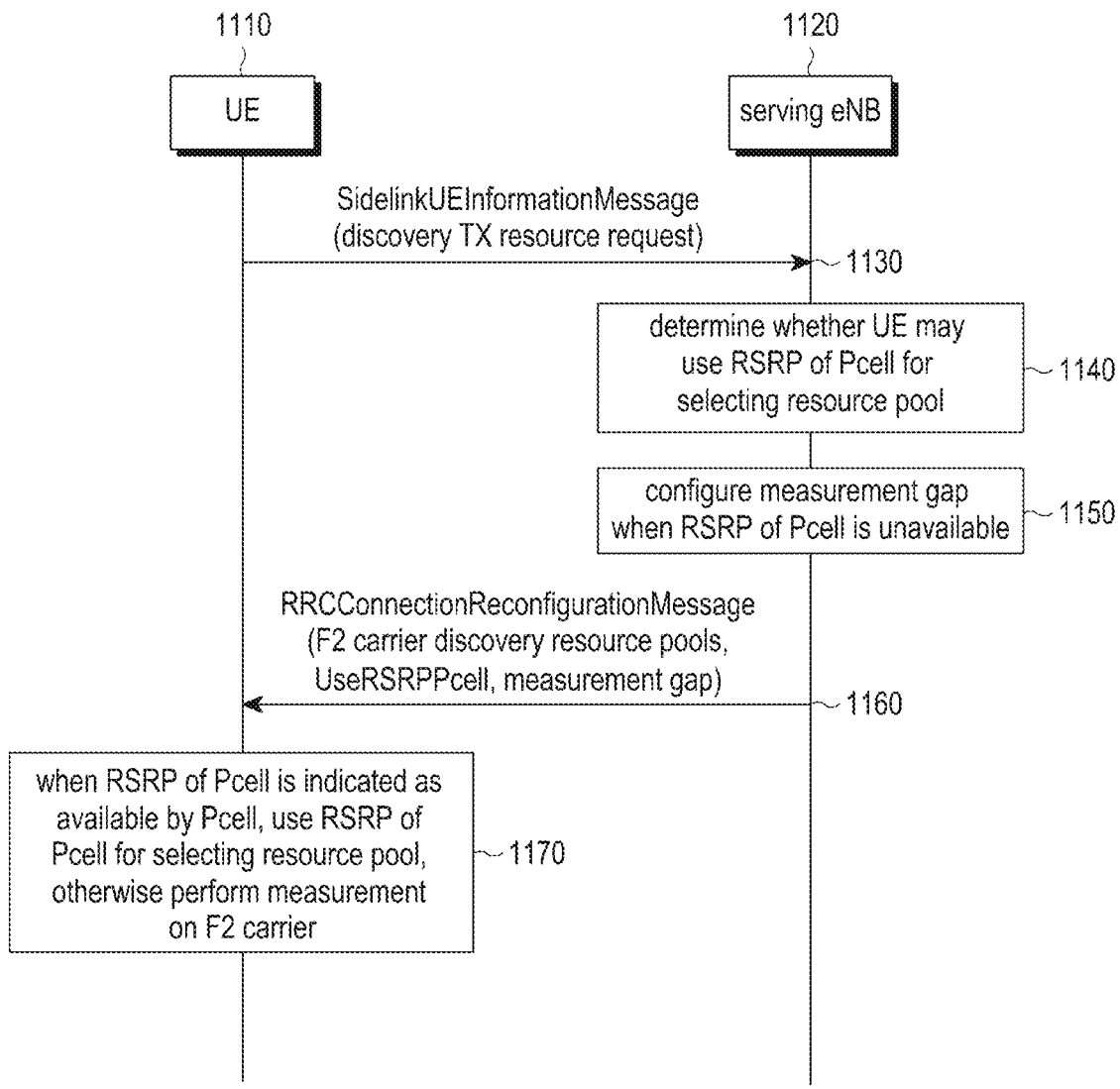
FIG. 11 is a flowchart illustrating a process for using reference signal received power (RSRP) of Pcell for selecting a discovery resource pool according to an embodiment of the present disclosure.

FIG. 11 is a flowchart illustrating a process for using RSRP of Pcell for selecting a discovery resource pool according to an embodiment of the present disclosure. Referring to FIG. 11, UE 1110 sends discovery TX resource request to serving eNB 1120 (1130). The discovery TX resource request can be sent through a SidelinkUEinformation message. Serving eNB 1120 provides Pcell or serving cell for UE. When receiving discovery TX resource request, serving eNB 1120 determines whether UE 1110 can use RSRP of Pcell to select resource pool for discovery transmission (1140). Unless RSRP of Pcell can be used for selecting resource pool, serving eNB 1120 can configure measurement gap for UE 1110 to perform measurement on F2 carrier (1150). Serving eNB 1120 sends discovery resource pools for F2 carrier, parameter UserRSRPPcell, or measurement gap to UE 1110. Such information can be sent through a RRCConnection Reconfiguration message. When it is indicated that RSRP of Pcell is available by Pcell (i.e., serving eNB 1120) (e.g., through parameter UseRSRPPcell), UE 1110 uses RSRP of Pcell for selecting resource pool. Otherwise (i.e., when RSRP of Pcell is indicated as unavailable), measurement on F2 carrier can be carried out (1170). Measurement on F2 carrier can be performed in the measurement gap notified of by serving eNB 1120.

Figure 12:
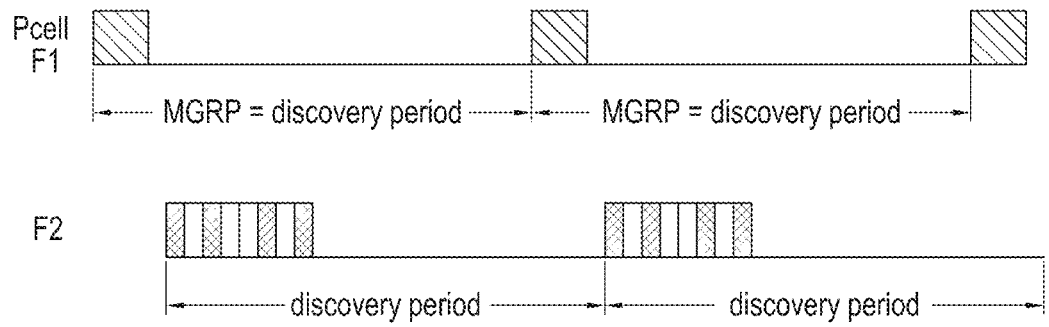
FIG. 12 is a view illustrating a measurement gap on F1 and a discovery period on F2 according to an embodiment of the present disclosure.

Measurement gap is described below in further detail with reference to FIG. 12. FIG. 12 is a view illustrating a measurement gap on F1 and a discovery period on F2 according to an embodiment of the present disclosure. Measurement gap repletion period (MGRP) which means the period of measurement gap 1210 can be set to be the same as discovery period. Measurement gap 1210 can be sorted so that measurement gap duration is positioned before discovery period starts. In some embodiments, measurement gap duration can be set to 6 ms.

In some embodiments, Pcell on F1 carrier can indicate whether UE can use RSRP of Pcell to select resource pool on F2 carrier in broadcast signaling (e.g., SIB). Unless RSRP of Pcell is available, UE sends a request for measurement gap using a portion of TX gap request or a new message. This is described in more detail with reference to FIGS. 13 and 14.

Figure 13:
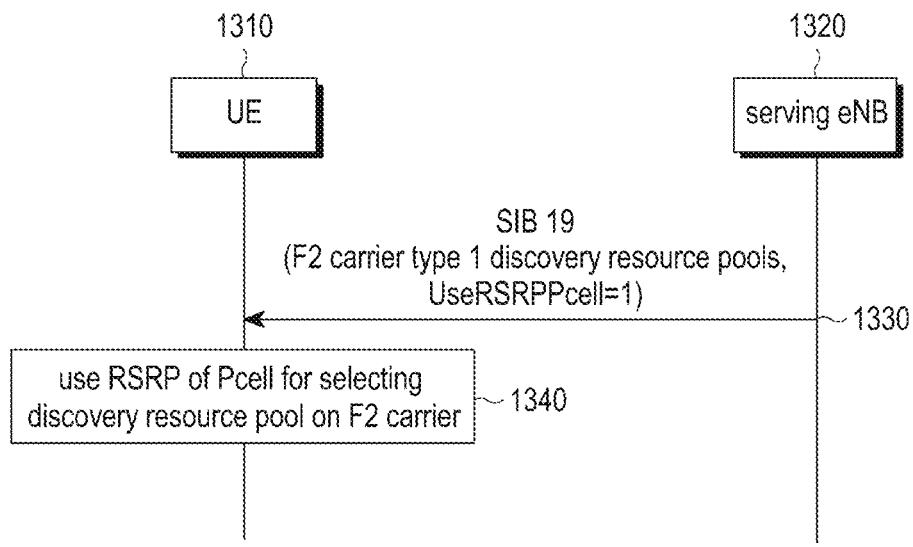
FIG. 13 is a flowchart illustrating a process when RSRP of Pcell is available for selecting a discovery resource pool according to an embodiment of the present disclosure.

FIG. 13 is a flowchart illustrating a process when RSRP of Pcell is available for selecting a discovery resource pool according to an embodiment of the present disclosure. Serving eNB 1320 broadcasts F2 carrier type 1 discovery resource pools and UseRSRPPcell using SIB 19 (1330). SIB 19 can be broadcast on F1 carrier. UseRSRPPcell parameter can be set to 1, indicating that RSRP of Pcell is available for selecting resource pool on F2 carrier. When receiving SIB 19 including UseRSRPPcell and type 1 discovery resource pools of F2 carrier, UE 1310 can use RSRP of Pcell to select discovery resource pool on F2 carrier (1340).

Figure 14:
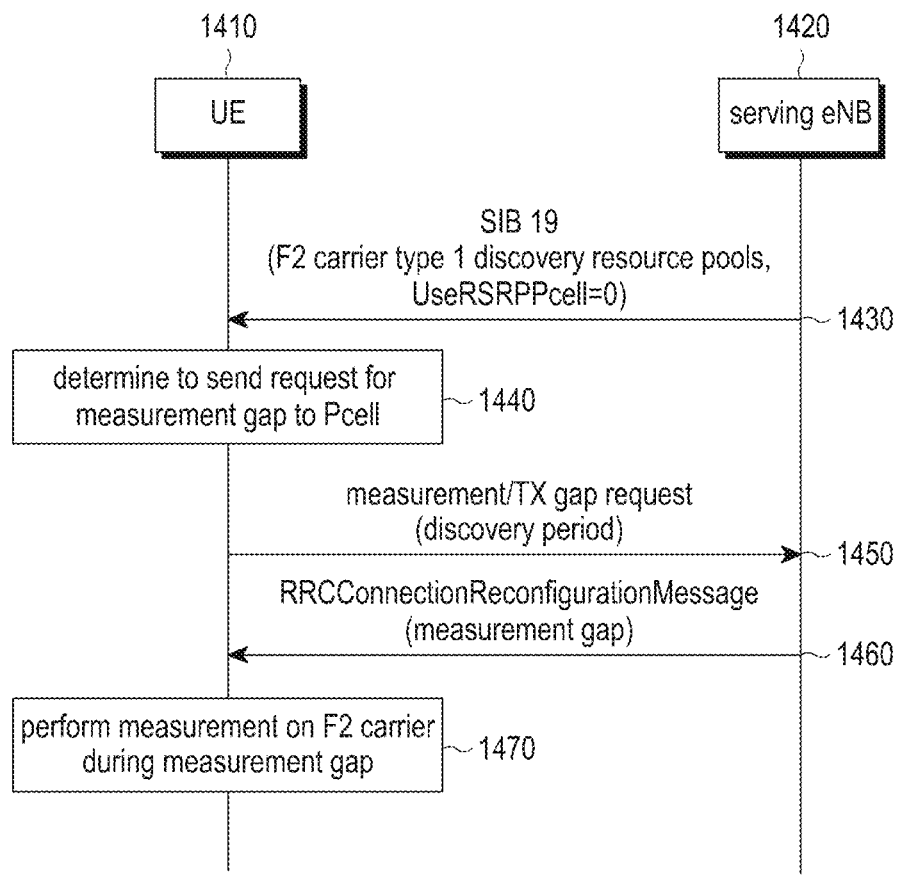
FIG. 14 is a flowchart illustrating a process when RSRP of Pcell is unavailable for selecting a discovery resource pool according to an embodiment of the present disclosure.

FIG. 14 is a flowchart illustrating a process when RSRP of Pcell is unavailable for selecting a discovery resource pool according to an embodiment of the present disclosure. Serving eNB 1420 broadcasts F2 carrier type 1 discovery resource pools and UseRSRPPcell using SIB 19 (1430). SIB 19 can be broadcast on F1 carrier. UseRSRPPcell parameter can be set to 0, indicating that RSRP of Pcell is unavailable for selecting resource pool on F2 carrier. When recognizing that RSRP of Pcell is unavailable for selecting resource pool on F2 carrier from UseRSRPPcell parameter, UE 1410 determines to send a request for measurement gap to Pcell (1440). UE 1410 sends TX gap request and measurement gap request on F1 carrier to serving eNB 1420 (1450). Measurement gap request or TX gap request can contain information on discovery period. Serving eNB 1420 sends information on measurement gap on F1 carrier to UE 1410. Measurement gap can be delivered through an RRCConnection Reconfiguration message. Measurement gap determined by serving eNB and sent to UE 1410 can be substantially the same as the measurement gap described above in connection with FIG. 12. When receiving information on measurement gap, UE 1410 performs measurement on F2 carrier during measurement gap (1470). UE 1410 selects discovery resource pool in subsequent discovery period based on measurement on F2 carrier during measurement gap.

In some embodiments, resources on F2 carrier might not be configured by Pcell. UE sends a request for measurement gap, indicate carrier information, and indicate discovery period and discovery offset for SFN=0. An offset can be selected so that there is a sufficient time between the start of discovery period on F2 carrier and measurement duration or termination of measurement gap. The eNB indicates whether UE uses RSRP of Pcell to select discovery resource pool using dedicated signaling. Unless RSRP of Pcell is available for selecting discovery resource pool on F2 carrier, Pcell can configure measurement gap. In some embodiments, MGRP can be set to be the same as discovery period. Measurement gap 1210 can be sorted so that measurement gap duration is positioned before discovery period starts. Measurement gap duration can be set to 6 ms. This is described in more detail with reference to FIG. 15.

Figure 15:
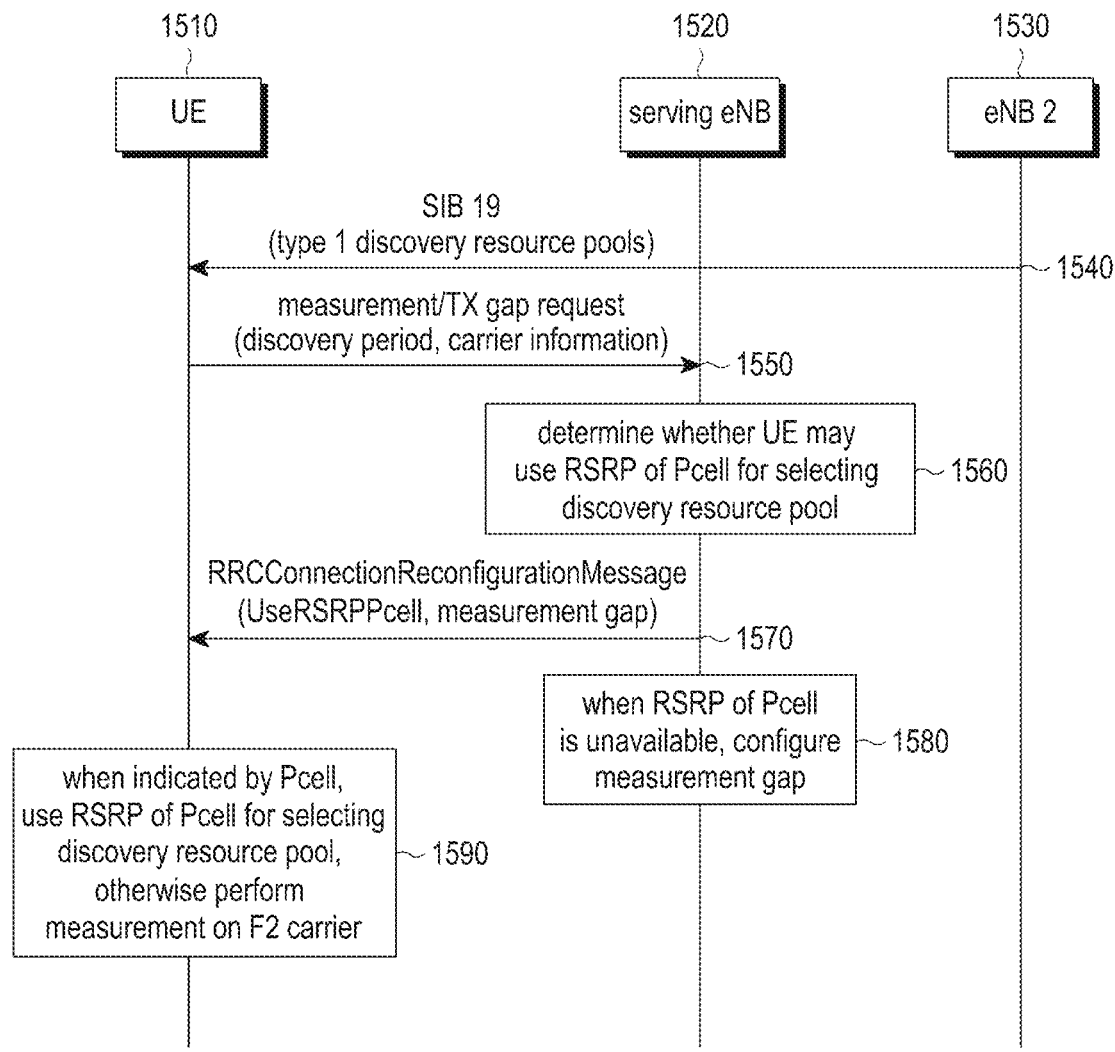
FIG. 15 is a flowchart illustrating a process for selecting a discovery resource pool when information on discovery resource pools is delivered not from Pcell but from another cell according to an embodiment of the present disclosure.

FIG. 15 is a flowchart illustrating a process for selecting a discovery resource pool when information on discovery resource pools is delivered not from Pcell but from another cell according to an embodiment of the present disclosure. The eNB2 1530 sends information on type 1 discovery resource pools for F2 carrier (1540). Information on type 1 discovery resource pools can be broadcast on F2 carrier using SIB 19. The eNB2 1530 can be a base station operating on F2 carrier which does not serve UE 1510 on F1 carrier. When receiving the information on type 1 discovery resource pools, UE 1510 sends discovery period and carrier information to serving eNB 1520. The carrier information can be information regarding carrier (i.e., F2 carrier) for UE 1510 to send discovery signal. The discovery period and carrier information can be included and sent in TX gap request or measurement gap request. Serving eNB 1520 determines whether UE can use RSRP of Pcell to select discover resource pool (1560). Serving eNB 1520 sends UseRSRPPcell, a parameter whose value is set based on the determination in operation 1560, to UE 1510 (1570). When it is determined in operation 1560 that RSRP of Pcell cannot be used for selecting discovery resource pool, serving eNB 1520 sends information regarding measurement gap, along with the UseRSRPPcell parameter, to UE 1510. The parameter UseRSRPPcell and measurement gap can be sent through a RRCConnection Reconfiguration message. When RSRP of Pcell is indicated as available for selecting discovery resource pool by Pcell (i.e., serving eNB 1520), UE 1510 uses RSRP of Pcell for selecting discovery resource pool. Otherwise, UE 1510 conducts measurement for selecting discovery resource pool using the received information regarding measurement gap (1590).

In some embodiments, lists of other carriers where RSRP is available for selecting discovery resource pool can be broadcast by cell on F2 carrier. This is described below in further detail with reference to FIG. 16.

Figure 16:
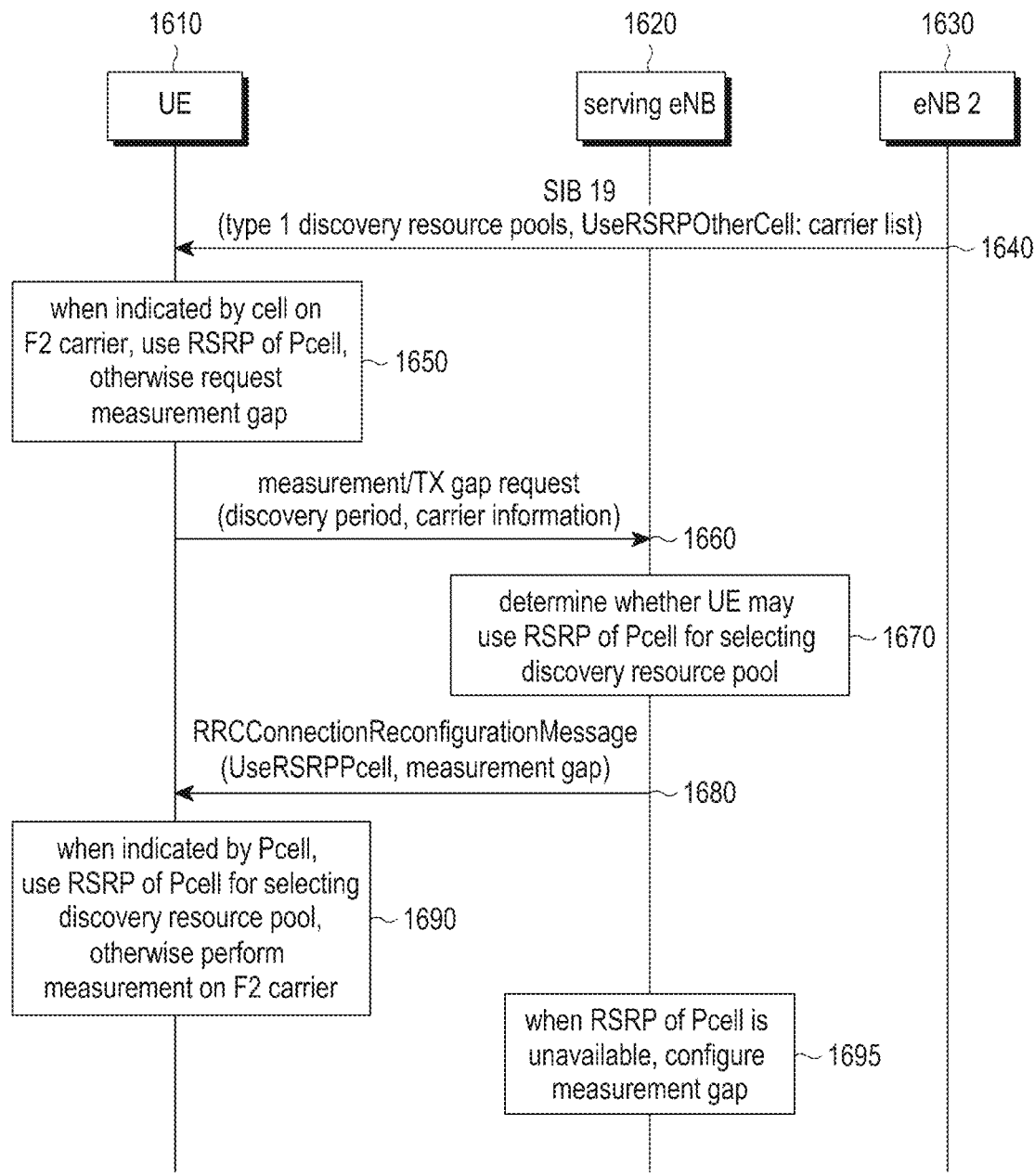
FIG. 16 is a flowchart illustrating a process for selecting a discovery resource pool when information on discovery resource pools is delivered not from Pcell but from another cell according to an embodiment of the present disclosure.

FIG. 16 is a flowchart illustrating a process for selecting a discovery resource pool when information on discovery resource pools is delivered not from Pcell but from another cell according to an embodiment of the present disclosure.

The eNB2 1630 broadcasts type 1 discovery resource pools on F2 carrier and parameter UseRSRPOtherCell using SIB (e.g., SIB 19) (1640). Parameter UseRSRPOtherCell can contain a list of other carriers (except for F2 carrier) where RSRP is available for selecting discovery resource pool. When RSRP of Pcell (i.e., serving eNB 1620) is indicated as available by cell (i.e., eNB2 1630) on F2 carrier, UE 1610 uses RSRP of Pcell to determine discovery resource pool, and can otherwise determine to request measurement gap (1650). When it is determined in operation 1650 to send a request for measurement gap, UE 1610 sends a measurement gap request or TX gap request including carrier information and discovery period to serving eNB 1620 (1660). Serving eNB 1620 determines whether UE 1610 can use RSRP of Pcell to select discover resource pool (1670). Serving eNB 1620 sends RRCConnectionReconfigurationMessage including measurement gap and parameter UseRSRPPcell indicating whether UE 1610 can use RSRP of Pcell for selecting discovery resource pool to UE 1610 (1680). When RSRP of Pcell is indicated as available for selecting discovery resource pool by Pcell (i.e., serving eNB 1620), UE 1610 uses RSRP of Pcell for selecting discovery resource pool. Otherwise, UE 1610 can conduct measurement for selecting discovery resource pool using the received information regarding measurement gap (1690). Serving eNB 1620, when RSRP of Pcell is unavailable, can configure a measurement gap according to the information on measurement gap sent to UE 1610 in operation 1680 (1695).

In some embodiments, lists of other carriers where RSRP is available for selecting discovery resource pool can be broadcast by cell on F1 carrier. This is described in more detail with reference to FIG. 17.

Figure 17:
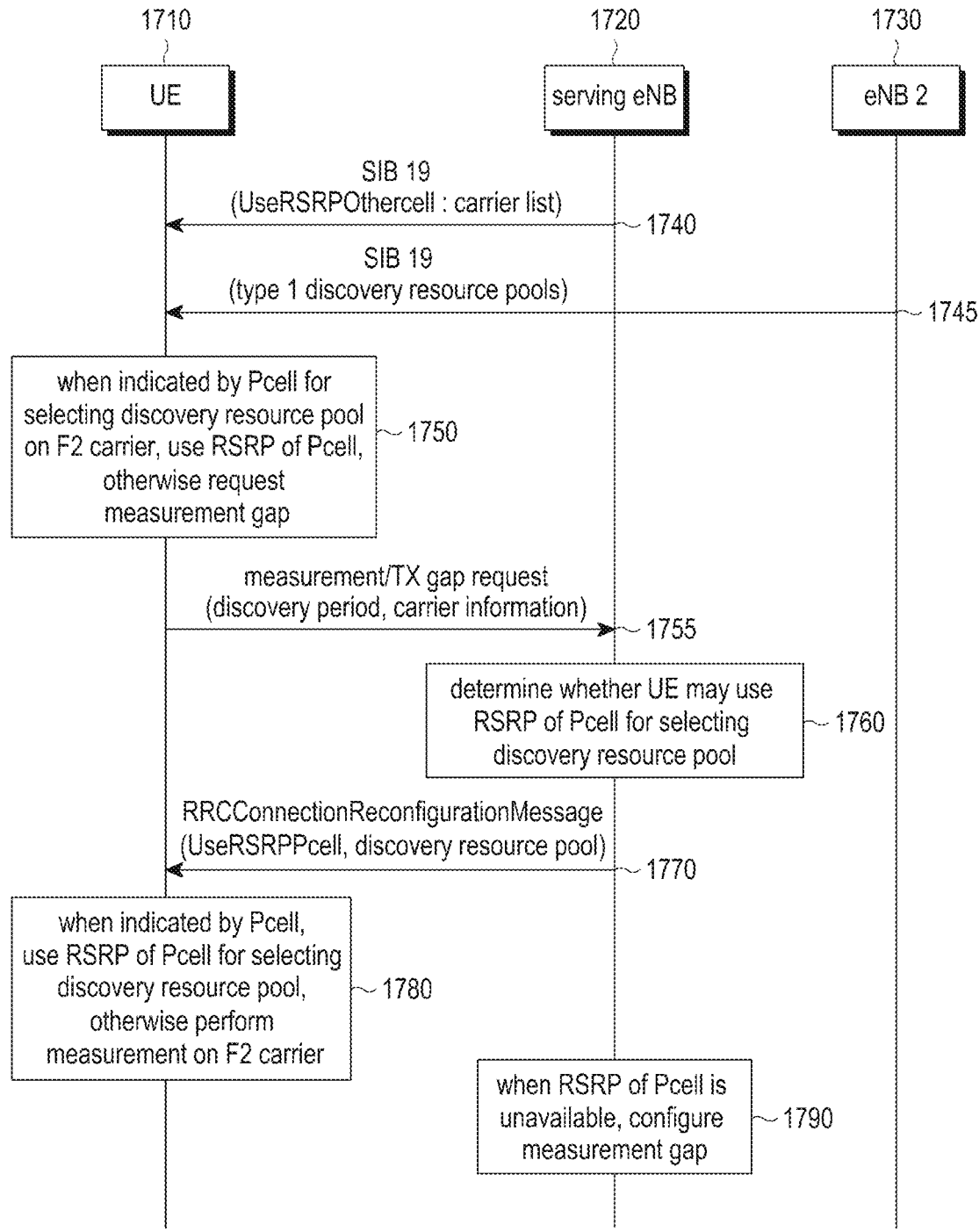
FIG. 17 is a flowchart illustrating a process for selecting a discovery resource pool when information on discovery resource pools is delivered not from Pcell but from another cell according to an embodiment of the present disclosure.

FIG. 17 is a flowchart illustrating a process for selecting a discovery resource pool when information on discovery resource pools is delivered not from Pcell but from another cell according to an embodiment of the present disclosure. Referring to FIG. 17, serving eNB 1720 can broadcast parameter UseRSRPOtherCell using SIB (e.g., SIB 19) (1740). Parameter UseRSRPOtherCell can contain a list of other carriers (except for F2 carrier) where RSRP is available for selecting discovery resource pool. The eNB2 1730 can broadcast type 1 discovery resource pools on F2 carrier using SIB (e.g., SIB 19) on F2 carrier (1745). When RSRP of Pcell (i.e., serving eNB 1720) is indicated as available for selecting discovery resource pool on F2 carrier, UE 1710 can use RSRP of Pcell for selecting discovery resource pool on F2 carrier, and can otherwise determine to request measurement gap (1750). When it is determined in operation 1750 to send a request for measurement gap, UE 1710 can send a measurement gap request or TX gap request including carrier information and discovery period to serving eNB 1720 (1755). Serving eNB 1720 can determine whether UE 1710 can use RSRP of Pcell to select discover resource pool (1770). Serving eNB 1720 can send RRCConnectionReconfigurationMessage including measurement gap and parameter UseRSRPPcell indicating whether UE 1710 can use RSRP of Pcell for selecting discovery resource pool to UE 1710 (1770). When RSRP of Pcell is indicated as available for selecting discovery resource pool by Pcell (i.e., serving eNB 1720), UE 1610 can use RSRP of Pcell for selecting discovery resource pool. Otherwise, UE 1710 can conduct measurement for selecting discovery resource pool using the received information regarding measurement gap (1780). Serving eNB 1720, when RSRP of Pcell is unavailable, can configure a measurement gap according to the information on measurement gap sent to UE 1710 in operation 1770 (1790).

Hereinafter, RX gap for receiving inter-carrier discovery signal is described.

When UE does not have an additional RX chain, UE cannot simultaneously receive downlink on serving carrier (i.e., F1 carrier) and discovery signal on another carrier (i.e., F2 carrier). In order to perform discovery reception on F2 carrier, RRC-connected UE can request serving eNB to abstain from scheduling downlink (i.e., providing RX gap) in subframes on F1 carrier overlapping discovery subframes on F2 carrier by sending RX gap request. The RX gap request can be signaled using a sidelinkUEInformation message. This is described in more detail with reference to FIG. 18.

Figure 18:
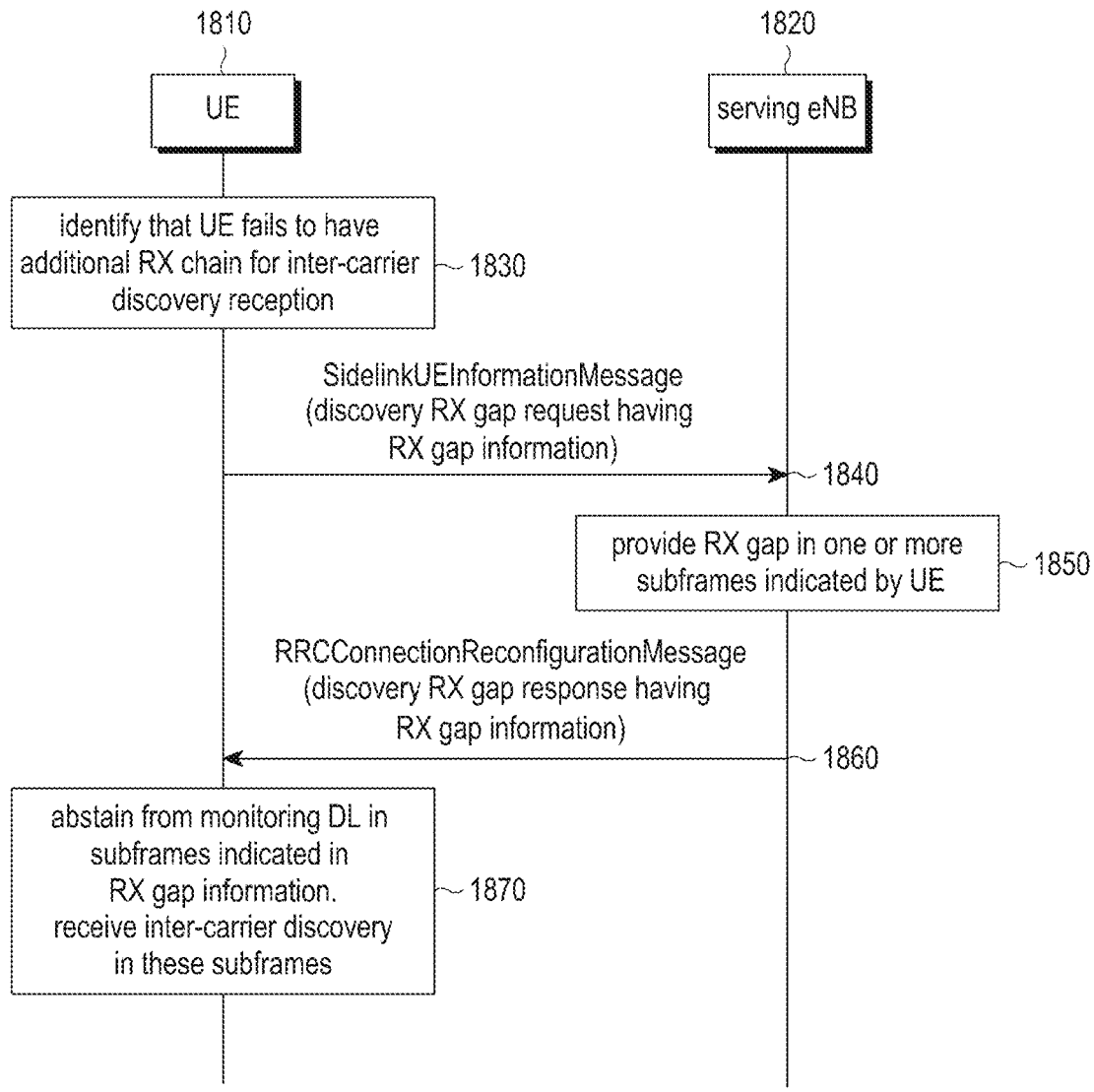
FIG. 18 is a flowchart illustrating a process for configuring a RX gap according to an embodiment of the present disclosure.

FIG. 18 is a flowchart illustrating a process for configuring a RX gap according to an embodiment of the present disclosure. Referring to FIG. 18, UE 1810 can identify that UE 1810 does not have an additional RX chain for inter-carrier discovery reception (1830). When UE 1810 does not have additional RX chain for inter-carrier discovery reception, UE 1810 sends a SidelinkUEInformation message containing discovery RX gap request having RX gap information to serving eNB 1820. Serving eNB 1820 determines to provide RX gap in one or more subframes indicated by UE using RX gap information (1850). Serving eNB 1820 sends RRCConnectionReconfiguration message containing discovery RX gap response having RX gap information to UE 1810. UE 1810 abstains from monitoring DL in subframes indicated in RX gap information contained in discovery RX gap response and can receive inter-carrier discovery in such subframes (1870).

Figure 19:
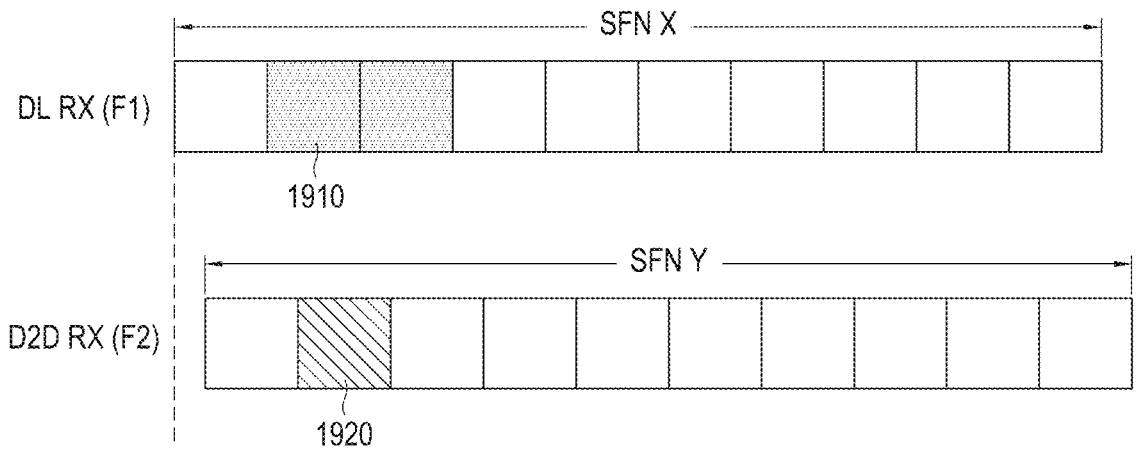
FIG. 19 is a view illustrating a configuration of a RX gap according to an embodiment of the present disclosure.

Subframes for discovery reception on F2 carrier and subframes for downlink reception on F1 carrier might not be aligned due to a sync failure between transmission times on F1 carrier and F2 carrier. This is described in more detail with reference to FIG. 19. FIG. 19 is a view illustrating a configuration of a RX gap according to an embodiment of the present disclosure. As shown in FIG. 19, up to two RX gaps 1910 of subframes may be needed for each discovery subframe 1920 on F2 carrier. Information on RX gaps 1910 (i.e., one or more downlink subframes which should not be scheduled for downlink by serving eNB) can be sent in RX gap request. Alternatively, UE can indicate subframes for discovery reception on F2 carrier in RX gap request. Serving eNB can determine downlink subframes overlapping subframes for discovery reception on F2 carrier. In such case, eNB should be able to recognize timing gap between D2D subframe on F2 carrier and downlink subframe on F1 carrier.

When receiving RX gap request, serving eNB may or may not provide RX gap for all subframes indicated by UE in RX gap request. RX gap response can give UE an indication as to subframes (i.e., subframes not required to be monitored by UE) where serving eNB is determined to provide RX gap.

RX gap response indicates whether UE's request is accepted or not. When accepted, UE need not perform any DL reception in DL subframe signaled by UE in RX gap request. Alternatively, RX gap response indicates whether UE's request is accepted or not. When accepted, eNB gives UE an additional indication as to DL subframes where UE need not conduct any DL reception.

Figure 20:
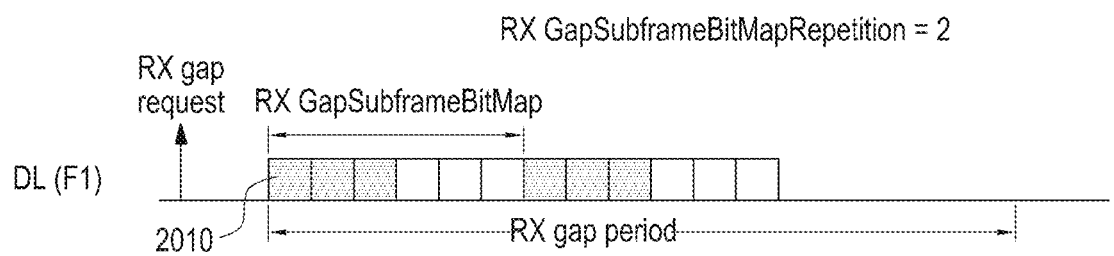
FIG. 20 is a view illustrating RX gap signaling parameters according to an embodiment of the present disclosure.
Figure 20:
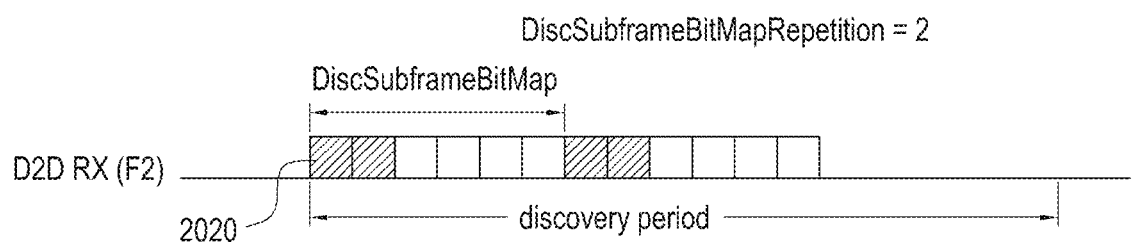

FIG. 20 is a view illustrating RX gap signaling parameters according to an embodiment of the present disclosure. Referring to FIG. 20, RX gaps can be indicated in RX gap request or RX gap response using the following parameters.

RXGapPeriod, indicates periodicity of RX gaps. Duration is the same as discovery period.

RXGapOffset, indicates the start position for SFN=0 of RX gap period.

RXGapSubfameBitMap, bitmap indicating subframes requiring RX gap.

RXGapSubframeBitMapRepetition, indicates the number of times of repetition of RXGapSubfameBitMap.

In some embodiments, RXGapSubframeBitMapRepetition might not be signaled, and RXGapSubfameBitMap may have a variable size N, instead. In some embodiments, multiple RXGapSubframeBitMap's is signaled.

Figure 21:
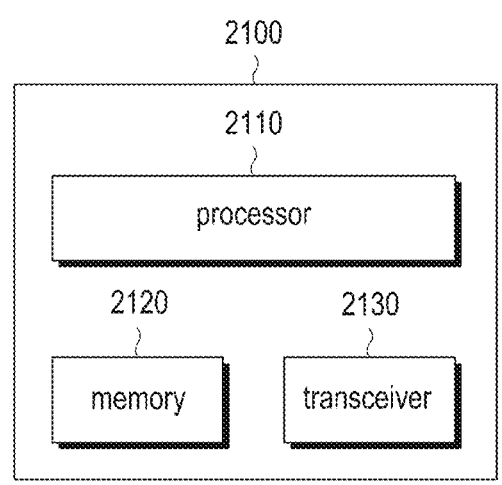
FIG. 21 is a block diagram illustrating a base station or UE according to an embodiment of the present disclosure.

According to the present disclosure, base station or UE is now described with reference to FIG. 21. FIG. 21 is a block diagram illustrating a base station or UE according to an embodiment of the present disclosure.

The UE is first described. The UE 2100 can be configured to perform the UE's operations described above. Referring to FIG. 9, the UE 2100 includes a processor 2110, a memory 2120, and a transceiver 2130. The processor 2110 is communicably and electrically connected with the memory 2120 and the transceiver 2130. The UE 2100 can transmit or receive signals and communicate with other entities through the transceiver 2130. The memory 2120 stores information for operations of the UE 2100. The memory 2120 can store commands or codes for controlling the processor 2110. The processor 2110 can be configured to control the operation of the UE 2100. The above-described operations of the UE 2100 can be processed and run substantially by the processor 2110. Although transmission or reception of signals is performed through the transceiver 2130, and storage of data and commands is carried out by the memory 2120, the operations of the transceiver 930 and the memory 2120 can be controlled by the processor 910, and thus, transmission and reception of signals and storage of data and commands can also be deemed to be performed by the processor 2110.

The base station is now described. The base station 2100 can be configured to perform the operation of base station, Pcell, serving eNB, or eNB2 as described above. The base station 2100 includes a processor 2110, a memory 2120, and a transceiver 2130. Substantially the same description given above for UE can apply to the processor 2110, memory 2120, and transceiver 2130.

It may be further appreciated by one of ordinary skill in the art that various exemplary logic blocks, modules, circuits, methods, and algorithms described in connection with embodiments described herein may be implemented in hardware, computer software, or a combination thereof. In order to clarify interchangeability between hardware and software, various exemplary components, blocks, modules, circuits, methods, and algorithms have been generally described in light of their functionality. Whether such functionality is implemented in hardware or software relies on a particular application and design limitations given to the overall system. The disclosed functionality may be embodied in various manners on each particular application by one of ordinary skill in the art, but such determination should not be interpreted as causing departure from the category of the present disclosure.

Various exemplary logic blocks, modules, and circuits described herein in embodiments the present disclosure may be implemented or performed by a general-purpose processor, digital signal processor (DSP), application specific integrated circuit (ASIC), field programmable gate array (FPGA) or other programmable logic device, discrete gate or transistor logic, discrete hardware components, or their combinations designed to carry out the functions disclosed herein. The general-purpose processor may be a microprocessor. Alternatively, the processor may be a common processor, controller, microcontroller, or state machine. Further, the processor may be implemented in a combination of computing devices, e.g., a combination of a DSP and a microprocessor, multiple microprocessors, one or more microprocessors integrated with a DSP core, or any other configurations.

The methods and algorithms described in connection with embodiments described herein may be directly implemented in hardware, a software module run by the processor, or in a combination thereof. The software module may reside in a random access memory (RAM), flash memory, read only memory (ROM), erasable programmable ROM (EPROM), electrically erasable programmable ROM (EEPROM), registers, hard disk, removable disk, compact disc ROM (CD-ROM) or any other type of storage medium known in the art. The storage medium may be combined with the processor so that the processor reads information out of the storage medium and record information in the storage medium. Alternatively, the storage medium may be integrated with the processor. The processor and storage medium may reside in an ASIC.

In one or more exemplary embodiments, the above-described functions may be implemented in hardware, software, firmware, or any combination thereof. When implemented in software, the functions may be stored as one or more instructions or codes in a computer readable medium or transmitted through the same. The computer readable medium includes both a communication medium and computer storage medium including any medium facilitating to transfer a computer program from one place to another. The storage medium may be any available medium accessible by a general-purpose or special-purpose computer. As a nonlimiting example, such computer readable medium may include a RAM, ROM, EEPROM, CD-ROM or other optical disc storage, magnetic disk storage or other magnetic storage devices, or any other medium available for transferring or storing program code means in a desired form of instructions or data structures and accessible by a general-purpose or special-purpose computer or special-purpose processor. Further, the access means is properly denoted the computer readable medium. For example, when the software is transmitted from a website, server, or other remote source using a coaxial cable, optical fiber cable, twisted pair, digital subscriber line (DSL), or infrared (IR) rays, or wireless techniques using wireless and microwaves, the coaxial cable, optical fiber cable, twisted pair, DSL, IR rays, and wireless techniques using wireless and microwaves belong to the definition of the medium. As used herein, the term "disk" or "disc" encompasses compact disc (CD), laser disc, optical disc, digital versatile disc (DVD), floppy disk, and Blu-ray disc, and here, the disk reproduces data generally magnetically while the disc reproduces data optically using laser beams. Combinations of those described above should be included in the computer readable medium.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method, performed by a base station on a first carrier, for providing discovery resource pool information to one or more user equipments (UEs), the method comprising:
   identifying information among first information, second information, third information and fourth information, for a second carrier among a plurality of carriers; and
   transmitting system information including carrier frequency information of the second carrier, wherein the carrier frequency information of the second carrier includes the identified information for the second carrier,
   wherein the first information includes discovery resource pool information of the second carrier,
   wherein the second information indicates to obtain the discovery resource pool information of the second carrier by reading a system information block (SIB) transmitted on the second carrier,
   wherein the third information indicates to obtain the discovery resource pool information of the second carrier by requesting the base station on the first carrier, and
   wherein the fourth information indicates not to transmit a discovery message on the second carrier.

2. The method of claim 1,
   wherein the system information further includes carrier frequency information of the plurality of carriers, and
   wherein each of the carrier frequency information of the plurality of carriers includes information among first information, second information, third information and fourth information, for each of the plurality of carriers.

3. The method of claim 1, further comprising:
   receiving, from a UE among the one or more UEs, a request for the discovery resource pool information of the second carrier in case that the carrier frequency information of the second carrier includes the third information for the second carrier.

4. The method of claim 1, wherein in case that the carrier frequency information of the second carrier includes the second information for the second carrier, the SIB transmitted on the second carrier is read at a UE to obtain the discovery resource pool information of the second carrier.

5. A base station for providing discovery resource pool information to one or more user equipments (UEs) on a first carrier, the base station comprising:
   a transceiver; and
   at least one processor coupled to the transceiver and configured to:
      identify information among first information, second information, third information and fourth information, for a second carrier among a plurality of carriers; and
      transmit system information including carrier frequency information of the second carrier, wherein the carrier frequency information of the second carrier includes the identified information for the second carrier,
   wherein the first information includes discovery resource pool information of the second carrier,
   wherein the second information indicates to obtain the discovery resource pool information of the second carrier by reading a system information block (SIB) transmitted on the second carrier,
   wherein the third information indicates to obtain the discovery resource pool information of the second carrier by requesting the base station on the first carrier, and
   wherein the fourth information indicates not to transmit a discovery message on the second carrier.

6. The base station of claim 5,
   wherein the system information further includes carrier frequency information of the plurality of carriers, and
   wherein each of the carrier frequency information of the plurality of carriers includes information among first information, second information, third information and fourth information, for each of the plurality of carriers.

7. The base station of claim 5, wherein the at least one processor is further configured to receive, from a UE among the one or more UEs, a request for the discovery resource pool information of the second carrier in case that the carrier frequency information of the second carrier includes the third information for the second carrier.

8. The base station of claim 5, wherein in case that the carrier frequency information of the second carrier includes the second information for the second carrier, the SIB transmitted on the second carrier is read at a UE to obtain the discovery resource pool information of the second carrier.

9. A method, performed by a user equipment (UE) in a radio resource control (RRC) idle state served by a base station on a first carrier, for obtaining discovery resource pool information, the method comprising:
   receiving, from the base station, system information including carrier frequency information of a second carrier, wherein the carrier frequency information of the second carrier includes information among first information, second information, third information and fourth information for the second carrier among a plurality of carriers; and
   identifying the information for the second carrier,
   wherein the first information includes discovery resource pool information of the second carrier,
   wherein the second information indicates to obtain the discovery resource pool information of the second carrier by reading a system information block (SIB) transmitted on the second carrier, wherein the third information indicates to obtain the discovery resource pool information of the second carrier by requesting the base station on the first carrier, and wherein the fourth information indicates not to transmit a discovery message on the second carrier.

10. The method of claim 9, wherein the system information further includes carrier frequency information of the plurality of carriers, and wherein each of the carrier frequency information of the plurality of carriers includes information among first information, second information, third information and fourth information, for each of the plurality of carriers.

11. The method of claim 9, further comprising:

transmitting, to the base station, a request for the discovery resource pool information of the second carrier in case that the carrier frequency information of the second carrier includes the third information for the second carrier.

12. The method of claim 9, further comprising:

reading the SIB transmitted on the second carrier to obtain the discovery resource pool information of the second carrier, in case that the carrier frequency information of the second carrier includes the second information for the second carrier.

13. A user equipment (UE) in a radio resource control (RRC) idle state, served by a base station on a first carrier for obtaining discovery resource pool information, the UE comprising:

a transceiver; and at least one processor coupled to the transceiver and configured to:

receive, from the base station, system information including carrier frequency information of a second carrier, wherein the carrier frequency information of the second carrier includes information among first information, second information, third information and fourth information for the second carrier among a plurality of carriers; and identify the information for the second carrier, wherein the first information includes discovery resource pool information of the second carrier, wherein the second information indicates to obtain the discovery resource pool information of the second carrier by reading a system information block (SIB) transmitted on the second carrier, wherein the third information indicates to obtain the discovery resource pool information of the second carrier by requesting the base station on the first carrier, and wherein the fourth information indicates not to transmit a discovery message on the second carrier.

14. The UE of claim 13, wherein the system information further includes carrier frequency information of the plurality of carriers, and wherein each of the carrier frequency information of the plurality of carriers includes information among first information, second information, third information and fourth information, for each of the plurality of carriers.

15. The UE of claim 13, wherein the at least one processor is further configured to transmit, to the base station, a request for the discovery resource pool information of the second carrier in case that the carrier frequency information of the second carrier includes the third information for the second carrier.

16. The UE of claim 13, wherein the at least one processor is further configured to read the SIB transmitted on the second carrier to obtain the discovery resource pool information of the second carrier, in case that the carrier frequency information of the second carrier includes the second information for the second carrier.

* * * * *